(12) United States Patent
Liu et al.

(10) Patent No.: US 9,742,992 B2
(45) Date of Patent: Aug. 22, 2017

(54) NON-UNIFORM CURVE SAMPLING METHOD FOR OBJECT TRACKING

(71) Applicant: CANON KABUSHIKI KAISHA, Tokyo (JP)

(72) Inventors: Xin Yu Liu, Cheltenham (AU); Pantelis Elinas, Glebe (AU)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 14/831,743

(22) Filed: Aug. 20, 2015

(65) Prior Publication Data
US 2016/0055648 A1 Feb. 25, 2016

(30) Foreign Application Priority Data
Aug. 22, 2014 (AU) .................................. 2014216000

(51) Int. Cl.
G06K 9/00 (2006.01)
H04N 5/232 (2006.01)
G06T 7/246 (2017.01)

(52) U.S. Cl.
CPC ......... H04N 5/23229 (2013.01); G06T 7/246 (2017.01); H04N 5/23296 (2013.01)

(58) Field of Classification Search
CPC ................................................ H04N 5/23296
See application file for complete search history.

(56) References Cited

U.S. PATENT DOCUMENTS

| | | | |
|---|---|---|---|
| 6,654,497 B1 | 11/2003 | Kondo et al. | |
| 6,731,799 B1 | 5/2004 | Sun et al. | |
| 6,937,760 B2 | 8/2005 | Schoepflin et al. | |
| 7,076,099 B2 | 7/2006 | Kondo et al. | |
| 7,596,243 B2 | 9/2009 | Paniconi et al. | |
| 2006/0056695 A1* | 3/2006 | Wu ....................... | G06T 1/0028 382/173 |
| 2006/0291696 A1 | 12/2006 | Shao et al. | |

(Continued)

OTHER PUBLICATIONS

Isard, et al.; Condensation—conditional density propagation for visual tracking; International Journal of Computer Vision; 1998, 29, pp. 5-28.

(Continued)

*Primary Examiner* — Oneal R Mistry
(74) *Attorney, Agent, or Firm* — Canon U.S.A., Inc. IP Division

(57) ABSTRACT

A method of tracking an object in a plurality of image frames includes receiving an initial contour associated with the edge object in a first one of the image frames. A plurality of first measurement points distributed non-uniformly along the initial contour are determined. The first measurement points are biased to relatively high information portions of the initial contour. A set of subsequent contours are estimated from the initial contour in a second image frame. An identical plurality of second measurement points are determined along each of the set of estimated subsequent contours in the second image frame using the same non-uniform distribution of the first measurement points in the first image frame. The method selects at least one contour of the set of estimated subsequent contours using a confidence measure determined from the second measurement points as distributed along the selected subsequent contour.

17 Claims, 17 Drawing Sheets

(56) References Cited

U.S. PATENT DOCUMENTS

| | | | |
|---|---|---|---|
| 2009/0028404 A1* | 1/2009 | Bussadori | A61B 8/08 382/130 |
| 2009/0238404 A1* | 9/2009 | Orderud | G06F 19/3437 382/103 |
| 2010/0157041 A1* | 6/2010 | Klaiman | A61B 5/0044 348/77 |
| 2014/0135625 A1* | 5/2014 | Konofagou | A61B 8/0883 600/443 |
| 2014/0146997 A1 | 5/2014 | Chang et al. | |
| 2015/0030229 A1* | 1/2015 | Borsdorf | A61B 6/12 382/132 |
| 2015/0228063 A1* | 8/2015 | Minakawa | H01J 37/244 382/151 |
| 2015/0317790 A1* | 11/2015 | Choi | G06T 7/0012 382/128 |

OTHER PUBLICATIONS

Comaniciu, D.; Ramesh, V.; Meer, P. "Kernel-based object tracking. Pattern Analysis and Machine Intelligence"; IEEE Transactions on May 2003, 25, pp. 564-577.

Chetverikov et al. ; "A Simple and Efficient Algorithm for Detection of High Curvature Points in Planar Curves"; Proc. 23rd Workshop of the Austrian Pattern Recognition Group, 1999.

* cited by examiner

NON-UNIFORM CURVE SAMPLING METHOD FOR OBJECT TRACKING

REFERENCE TO RELATED PATENT APPLICATION(S)

This application claims the benefit under 35 U.S.C. §119 of the filing date of Australian Patent Application No. 2014216000, filed Aug. 22, 2014, hereby incorporated by reference in its entirety as if fully set forth herein.

TECHNICAL FIELD

The current invention relates generally to image and video processing and, in particular, to the problem of tracking an object in the scene.

BACKGROUND

Tracking the position of image structures or objects in video is important for video understanding, especially in the domain of surveillance where objects need to be followed over time. In general, there are two major components of a visual tracking system: Target Representation, and Localization. One way to represent a target object is to use a contour or contour segments of the object, and associate the same contour(s) in consecutive video frames. Accurate tracking of a contour is an essential building block for robust object tracking.

One approach to contour tracking is the Conditional Density Propagation (Condensation) algorithm. Condensation tracks a B-spline representation of a contour with a particle filter. First, in an initialisation step, the Condensation algorithm approximates the input contour with a B-spline curve and initialises the tracking system with a number of copies of the same curve particle. Next, during the tracking stage, a three-step process is employed. Firstly, a prediction step is used to hypothesize future states of each particle based on a dynamical model of system evolution. Secondly, observation likelihood scores of the particles are computed by drawing fixed length normal lines that are centred on the measurement points along the spline curve, and then measuring the proximity of each measurement point to the strongest and nearest edge in the image along the normal lines. The prediction and observation steps are also known as the Dynamics and Observation. Thirdly, in the resampling stage, a fixed number of particles are selected for repeating the same tracking process in the next frame.

Condensation works effectively on contours which enclose the whole object. However, when the tracking algorithm is applied to tracking contour segments of a non-rigid object, e.g. an outline of a person's head and shoulders or part of the person's leg, Condensation easily confuses a tracked contour segment with background structures presented in a cluttered scene.

One way to overcome the problem of confusing tracked contour segment with background structure is to employ an adaptive normal line scanning method at the Observation stage. More specifically, the normal line length is adaptive in two aspects: adaptive line length, and adaptive line centre. The line length is made to grow and shrink based on the pose variance, and the amount of line growth and shrinkage is learnt in an off-line training phase. The line centre is made adaptive by applying a distance transform. There are two downsides to this approach. First, an offline training process is involved which makes the tracking system application specific and dependent on provided training samples. Second, the centres of each normal line and line length on each contour hypothesis are recomputed for each input frame. This is computationally expensive, hence making such technique unsuitable for real-time tracking applications.

What is needed is a method that tracks contours and contour segments, particularly when presented with cluttered background, that is independent of application specific training data and that is practical to use in a real time application.

SUMMARY

According to one aspect of the present disclosure there is provided a method of tracking an object in a plurality of image frames, the method comprising:

receiving an initial contour associated with the object in a first one of the image frames, said initial contour representing an edge of the object;

determining a plurality of first measurement points distributed non-uniformly along the initial contour, said first measurement points being biased to relatively high information portions of the initial contour;

estimating a set of subsequent contours in a second one of the image frames, each of said subsequent contours being estimated from the initial contour;

determining) an identical plurality of second measurement points along each of the set of estimated subsequent contours in the second image frame using the non-uniform distribution of the first measurement points in the first image frame; and selecting at least one contour of the set of estimated subsequent contours using a confidence measure determined from the plurality of second measurement points as distributed along the selected subsequent contour, said selected subsequent contour being used to track the object in the second image frame.

Preferably the plurality of second measurement points for each of the estimated subsequent contours corresponds in number and distribution to the plurality of first measurement points of the initial contour.

Desirably the estimating of the set of subsequent contours comprises estimating splines of the subsequent contours independent of the second image frame.

In a specific implementation, the determining of the plurality of first measurement points comprises: fitting an initial spline to said initial contour; determining the first measurement points distributed non-uniformly along the initial spline; and instantiating contour particles from the initial spline.

Desirably the determining of the first measurement points comprises:

detecting relatively high curvature points along the initial spline;

determining high curvature areas associated with the high curvature points;

determining flat areas along the spline complementing the high curvature areas; and determining locations of the first measurement points in each of the high curvature areas and the flat areas along the spline.

Preferably the determining of the high curvature areas comprises:

determining a target sample count representing the number of measurement points to be located along the spline;

calculating a width of the high curvature areas representing that portion of the spline effected by high curvature points;

setting a sampling ratio representing a ratio of a number of measurement points in a high curvature area compared to a number of measurement points that a uniform sampling would otherwise produce; and computing a density value representing a number of measurement points for each high curvature area of the spline.

For example, the determining of the flat areas may include:

determining a number of measurement points for flat areas based upon the target sample count, the number of high curvature points and the density value;

obtaining flat areas complementing the high curvature areas;

computing an accumulated length of the flat areas; and computing a flat area sampling rate according to the computed accumulated length and the number of measurement points for flat areas.

Advantageously, the determining of the locations of the measurement points for the high curvature areas comprises: computing a sampling rate for the high curvature areas from the width and the density value; and for each high curvature area, establishing a start measurement point and iteratively incrementally adding the sampling rate to establish the location of a next measurement point for the high curvature area.

In another implementation the determining of the locations of the measurement points for the flat areas comprises for each flat area, establishing a start measurement point and iteratively incrementally adding the flat area sampling rate to establish the location of a next measurement point for the flat area.

Other aspects are also disclosed.

BRIEF DESCRIPTION OF THE DRAWINGS

At least one embodiment of the present invention will now be described with reference to the following drawings, in which.

DETAILED DESCRIPTION INCLUDING BEST MODE

Figure 1:
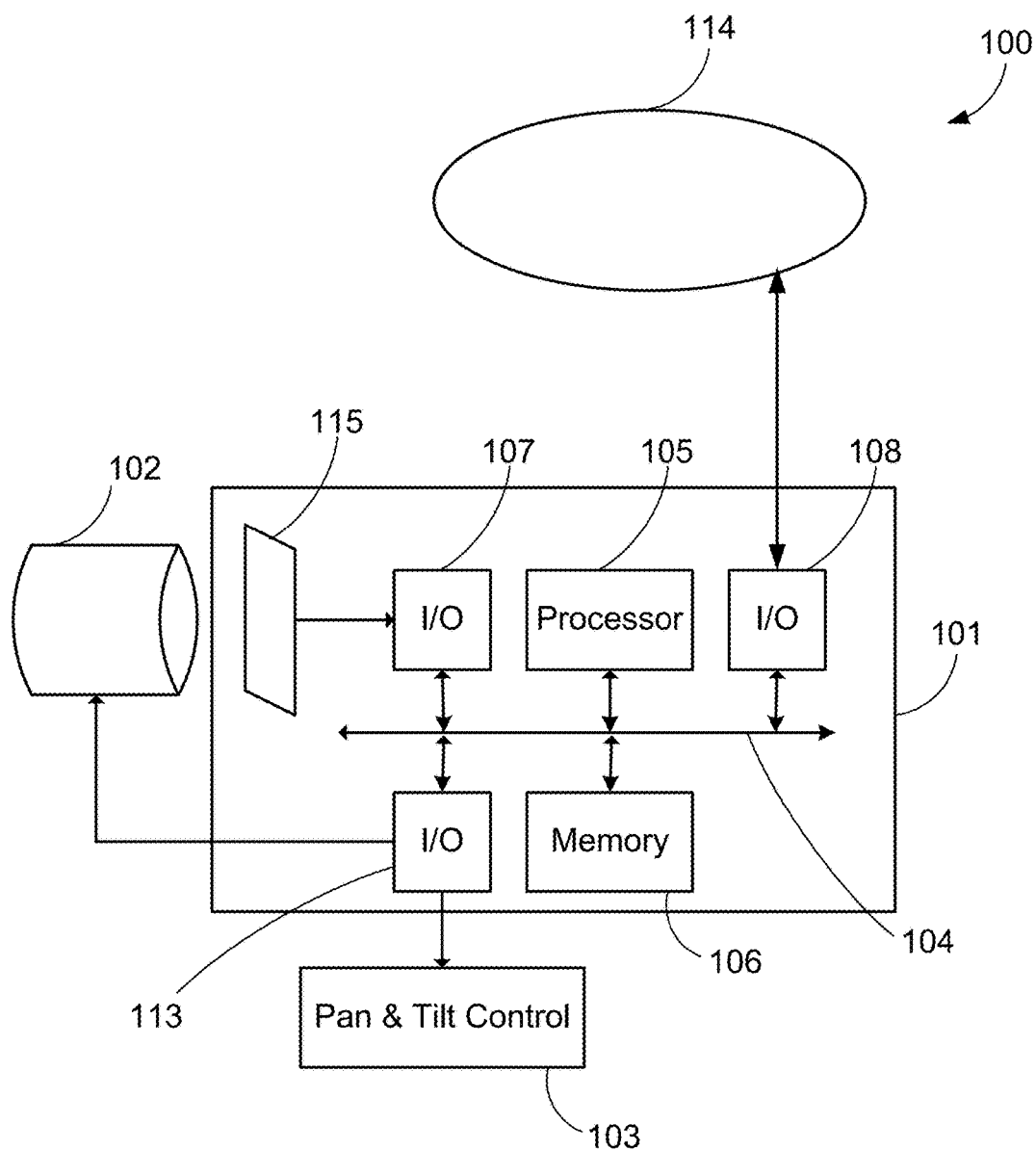
FIG. 1 is a function block diagram of a camera, upon which contour feature extraction of an image can be performed according to the present disclosure.

FIG. 1 shows a function block diagram of a camera 100, upon which contour feature extraction on input images is preferably performed. The camera 100 is desirably a pan-tilt-zoom camera (PTZ) comprising a camera module 101, a pan and tilt module 103, and a lens system 102. The camera module 101 typically includes at least one processor unit 105, and a memory unit 106, a photo-sensitive sensor array 115, an input/output (I/O) interface 107 that couples to the sensor array 115, an input/output (I/O) interface 108 that couples to a communications network 114, and an interface 113 for the pan and tilt module 103 and the lens system 102. The components 107, 105, 108, 113 and 106 of the camera module 101 typically communicate via an interconnected bus 104 and in a manner which results in a conventional mode of operation known to those in the relevant art. The presently disclosed arrangements for contour feature extraction are typically implemented as computer program code that is stored in the memory 106 and which is executable by the processor 105 to perform contour feature extraction.

The camera 100 is used to capture video frames, also known as input images or input frames, representing the visual content of a scene appearing in the field of view of the camera 100, and which are stored in the memory 106. The computer program when executed extracts contour segments (also referred to as curves in this document) and tracks the contours from the input frames in sequence. Although the camera 100 is described as a PTZ camera, the presently disclosed arrangements can be implemented as computer program and run on wide variety of cameras including but not limited to: static field-of-view cameras, PTZ cameras, wearable cameras and handheld cameras.

Further, although the arrangements presently disclosed are focussed upon implementation in a single camera, the software programs may similarly be loaded to and execute on other types of computing devices, such as desktop and notebook computers, tablet computers, as well as server computing environments, where desired. However, in surveillance system implementations, which typically comprise a number of cameras, real-time processing is best performed in a distributed fashion with each camera performing tracking of images captured thereby.

Figure 2:
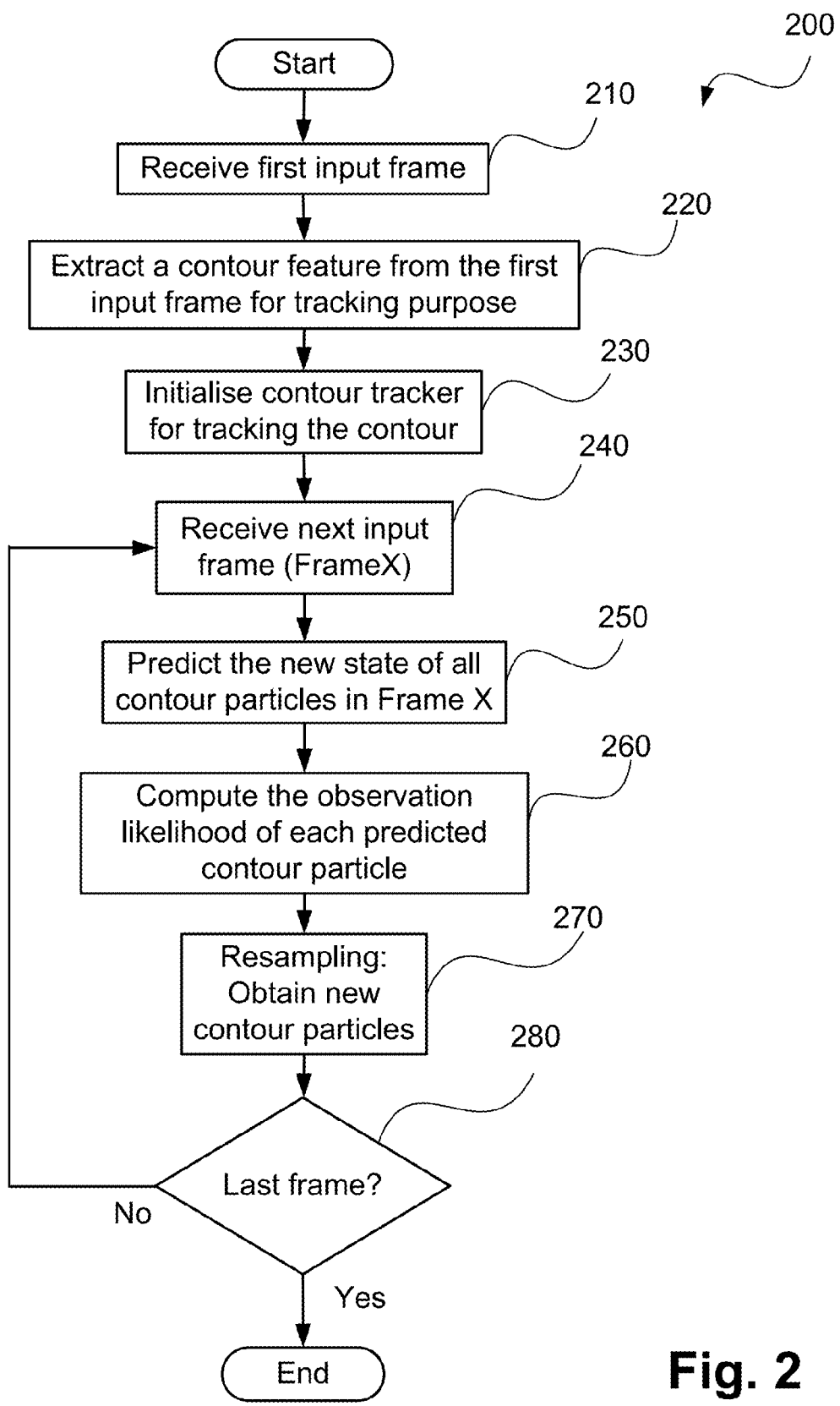
FIG. 2 is a flow diagram illustrating a method of tracking of a contour.

FIG. 2 is a flow diagram illustrating a method 200 of tracking one contour in consecutive video frames using a particle filter method as the basis for tracking. The method 200 and its various steps and sub-steps are preferably implemented in software which is stored in the memory 106 for execution by the processor 105 upon images captured via the sensor 115, to thereby implement a tracking system. In the particle filter method, a probability distribution of the new location of the tracked object is hypothesized. A particle, or particle state, represents a sample or a point in that distribution. More specifically, a state of a contour particle describes information such as the size and location of the contour in an image. Particle filters are known for producing a set of one or a limited number of best results, and not necessarily a single best result, such as produced by a Kalman filter. The tracking system has a finite number, say N=300, of particles. Typically, a particle has an associated weight value, also known as observation likelihood, which represents the probability of that particle being sampled from a probability density function. In other words, the weight value of a particle indicates the "fitness" of this particle. In this document, the fitness of a particle is referred to as a 'confidence measure'.

The method 200 shown in FIG. 2 begins with receiving the first input frame at step 210. For example, the frame which had previously been stored in the memory 106 after capture, is retrieved from the memory 106 for processing by the processor 105. Alternatively, the captured frame may be passed from the I/O module 107 to each of the memory 106 and processor 105 for substantially simultaneous storage and processing respectively. Next the flow moves to extracting a contour segment from the input frame at step 220. The extracted contour segment is also referred to as the initial contour in this document. In addition, the contour segment should associate with an object of interest, e.g., a car driving pass the scene, or a person walking towards the camera 100. The extracted contour segment represents an edge of a tracked object. In one implementation, a Canny edge detector is used to extract an edge of an object. Significantly, the contour and the edge need not and usually will not be identical. This is because, firstly, an edge may not be well-defined, and may include inconsistencies or noise, and thus imperfect. Secondly, the extracted contour of the edge is an estimate of a curve fitted to the imperfect edge. The estimated curve may be constructed from a number of joined spline-based curves, each of which is only an estimate of a portion of the imperfect edge.

Figure 16:
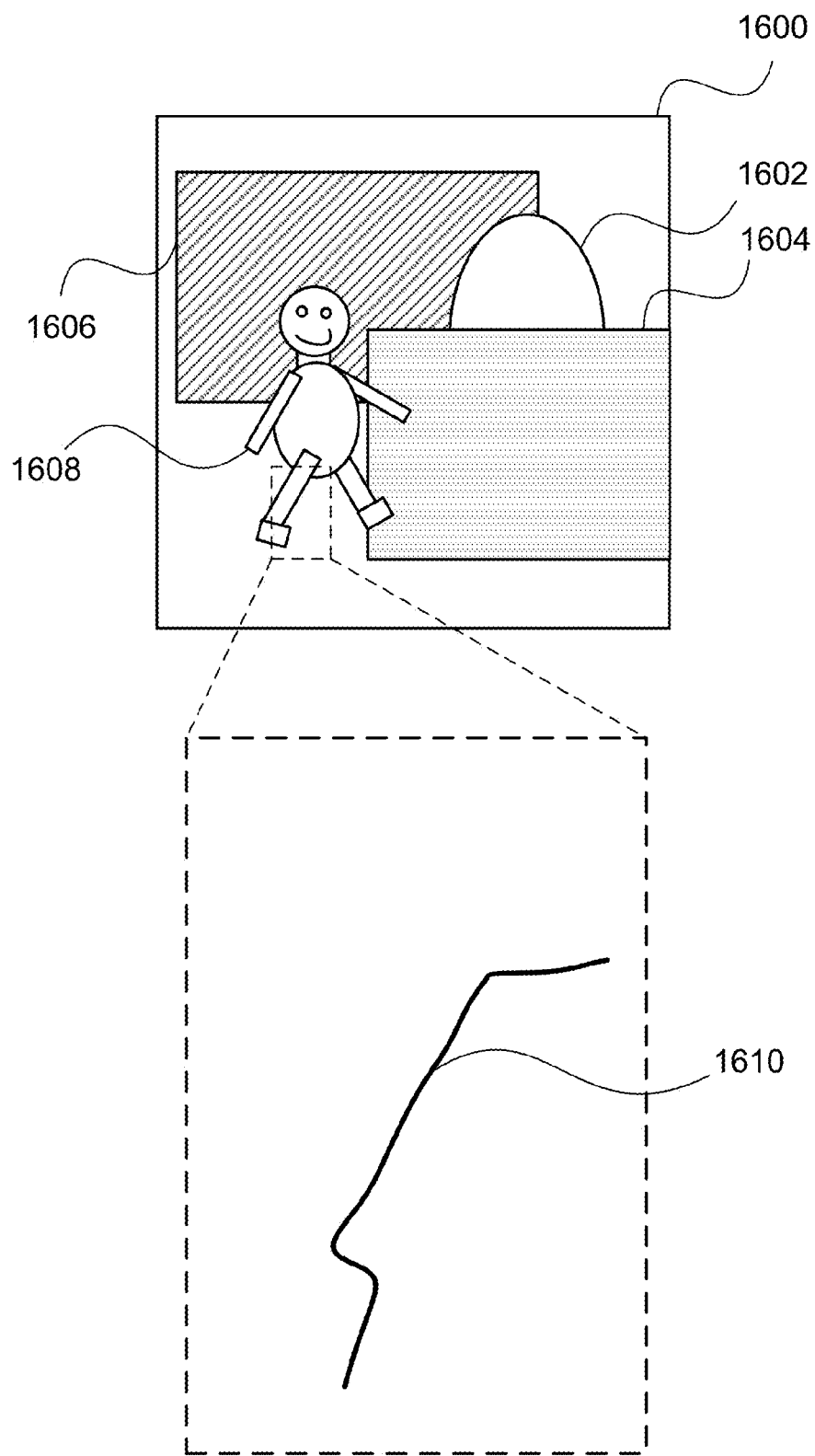
FIG. 16 is a representation of a captured image frame and an enlargement of a contour curve of an object extracted from that frame.

A generalised example of the process of step 210 and 220 is seen in FIG. 16 where an image frame 1600 captured by the camera system 100 includes an object (a person) 1608 moving in a scene formed with other objects 1602, 1604 and 1606, which may be static (e.g. buildings or structures) or active (e.g. trees moving in the wind, motor vehicles etc.). FIG. 16 also shows an enlargement of a single contour or curve 1610, derived from an edge of the moving object 1608, and upon which tracking is performed.

Figure 5:
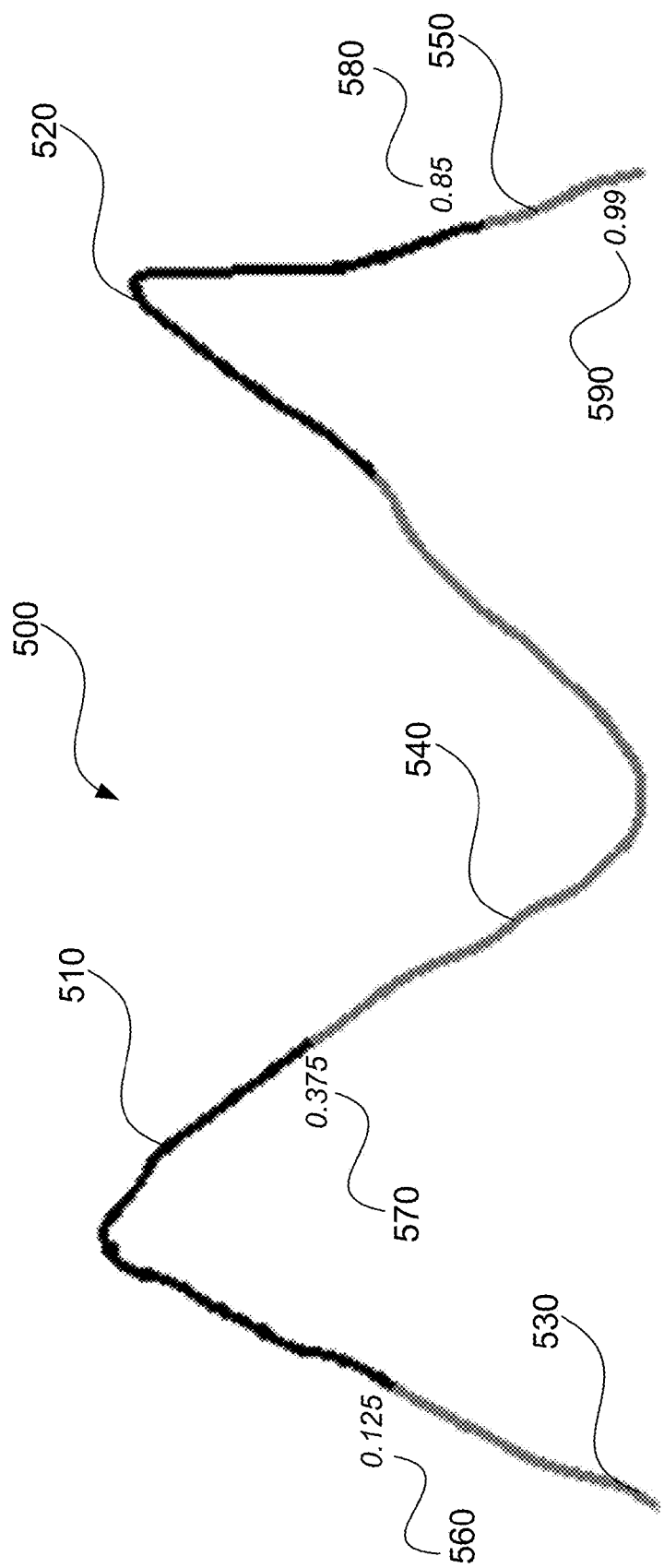
FIG. 5 is a schematic diagram illustrating the High Curvature Areas and Flat Areas of a contour.

A further example of a contour segment is illustrated in FIG. 5 in which an "M" shape contour 500 is present. The example of FIG. 5 will be used for detailed consideration throughout this description and, like the contour 1610, is shown isolated, effectively in free space, as the considerations involved in the present description do not depend upon any axes or alignment with the image frame, but rather to the individual consideration of features of curves.

Next, the method 200 moves to a tracking system initialisation step 230. In step 230, all particles are initialised based on the contour 500 extracted in step 220. The details of the initialisation of the tracking system are presented in FIG. 3.

Figure 17B:
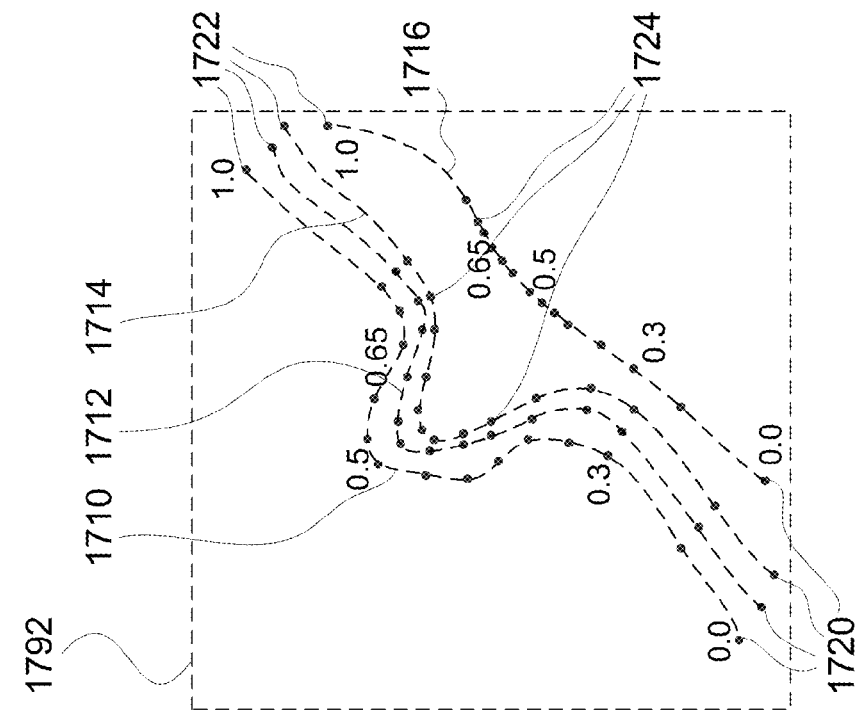
FIG. 17B is a representation of a number of predictions of the curve of FIG. 17A for a subsequent frame of a video sequence, each with corresponding distribution and number of measurement points.
Figure 17A:
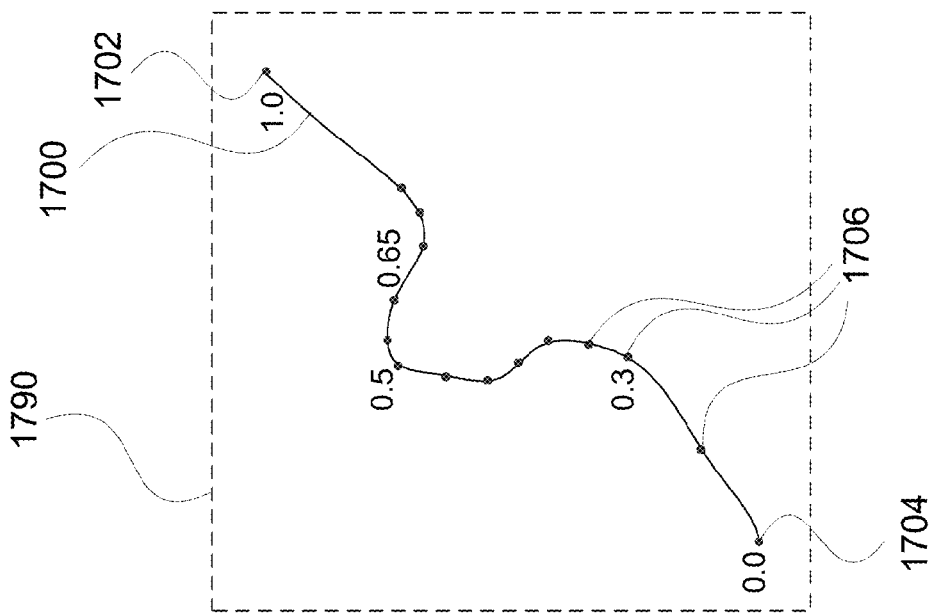
FIG. 17A is a representation of an exemplary contour curve and associated measurement points for a first frame.

After the contour particles of the tracking system are initialised with the contour segment 500, the method 200 moves to a new frame receiving step 240. In step 240, in a real-time implementation, a new frame X is captured by the sensor 115 and received by the tracking system in the processor 105. Next, at step 250, a dynamical model is applied to all the contour particles to make a prediction of the new state of the particles of the contour for current (new) frame. The new state of the contour particles is also referred to as contour hypothesis. More information on the prediction step 250 is available in FIG. 11, and discussed elsewhere. Step 250 operates therefore, after the first frame, to estimate a set of subsequent contours in a second or subsequent image frame, in which each of the subsequent contours is estimated from the initial contour. An example of this is seen in FIGS. 17A and 17B, where FIG. 17A shows an exemplary initial contour 1700 of part of a first frame 1790. The contour 1700 is identified by end points 1702 and 1704 and intermediate points 1706 that are used to define the shape of the contour 1700 for tracking purposes. FIG. 17B shows a number of predictions, or hypotheses, 1710, 1712, 1714 and 1716 for the contour 1700 for a part of next or subsequent frame 1792 of video capture. In FIG. 17B, the contours 1710-1716 are represented within a bounding box 1720 so as to assist the reader of this document in understanding that each predicted contour 1710-1716 differs from other predictions. The differences may be non-existent, small or substantial. In the specific example illustrated, the contour 1710 is positioned identically to the contour 1700, therefore representing a prediction of no movement or change of the contour 1700/1710 between the respective frames. Contours 1712 and 1714 each are of generally similar but not identical in shape and size to that of contour 1700, and repositioned to predict certain respective amounts of movement. Contour 1716 is a prediction that is slightly shorter and of significantly different (flatter) shape than the other predictions of FIG. 17B. Generally a great number of predictions are made on a frame-by-frame basis. Predictions are made according to a modelling accurancy and therefore are never exactly true and, in some case, can be quite incorrect. In some implementations, there may be a thousand or more predictions generated, from which a set of one or a limited number of predictions are identified as most likely predictions and used for the subsequent frame. Where the contours 1710-1716 are for the immediate next frame 1792 after the frame 1790, a likelihood of the contour 1716 being selected would be very low (but not zero) because of its large difference. Contour 1716 is provided for illustrative purposes and would be somewhat extraordinary in practice and even more extraordinary if such were selected as the prediction for the frame 1792.

Each prediction 1710-1716 has a number of points, being the end points 1720 and 1722, and intermediate points 1724 (only some of which are labelled for the purposes of clarity) that used identify the respective contour, its shape and position, as seen relative to the other predictions. Note that the number of points used for measuring each prediction contour remains the same for each prediction, regardless of size, shape or position of the prediction, and corresponds in number to those of the initial contour 1700, being 15 in this example.

After the new state of each contour is hypothesized, step 260 then causes the tracking system to compute the observation likelihood for each hypothesized contour particle against current frame. Step 260 is also known as the Observation step, or Measurement step. The purpose of the Observation step 260 is to measure the "fitness" of each contour hypothesis. Based on the fitness, the system is able to discern a "good" contour hypothesis from a "bad" hypothesis. Hence, the fitness is a confidence measure. The details of the Observation step 260 are presented in FIG. 12 and described elsewhere.

After the values of the observation likelihood are computed in step 260, the method 200 moves to a resampling step 270. In the resampling step 270, contour particles with negligible weights are replaced by new particles in the proximity of the particles with higher weights, also known as the Importance Resampling. The detail of the particle resampling step 270 is presented in FIG. 14 and described elsewhere.

After new contour particles are resampled, the method 200 moves to a checking step 280. In step 280, the tracking system checks if all frames of the captured video sequence have been processed. If not, the method 200 loops back to step 240 to process another input frame. Otherwise, the method 200 ends.

Figure 3:
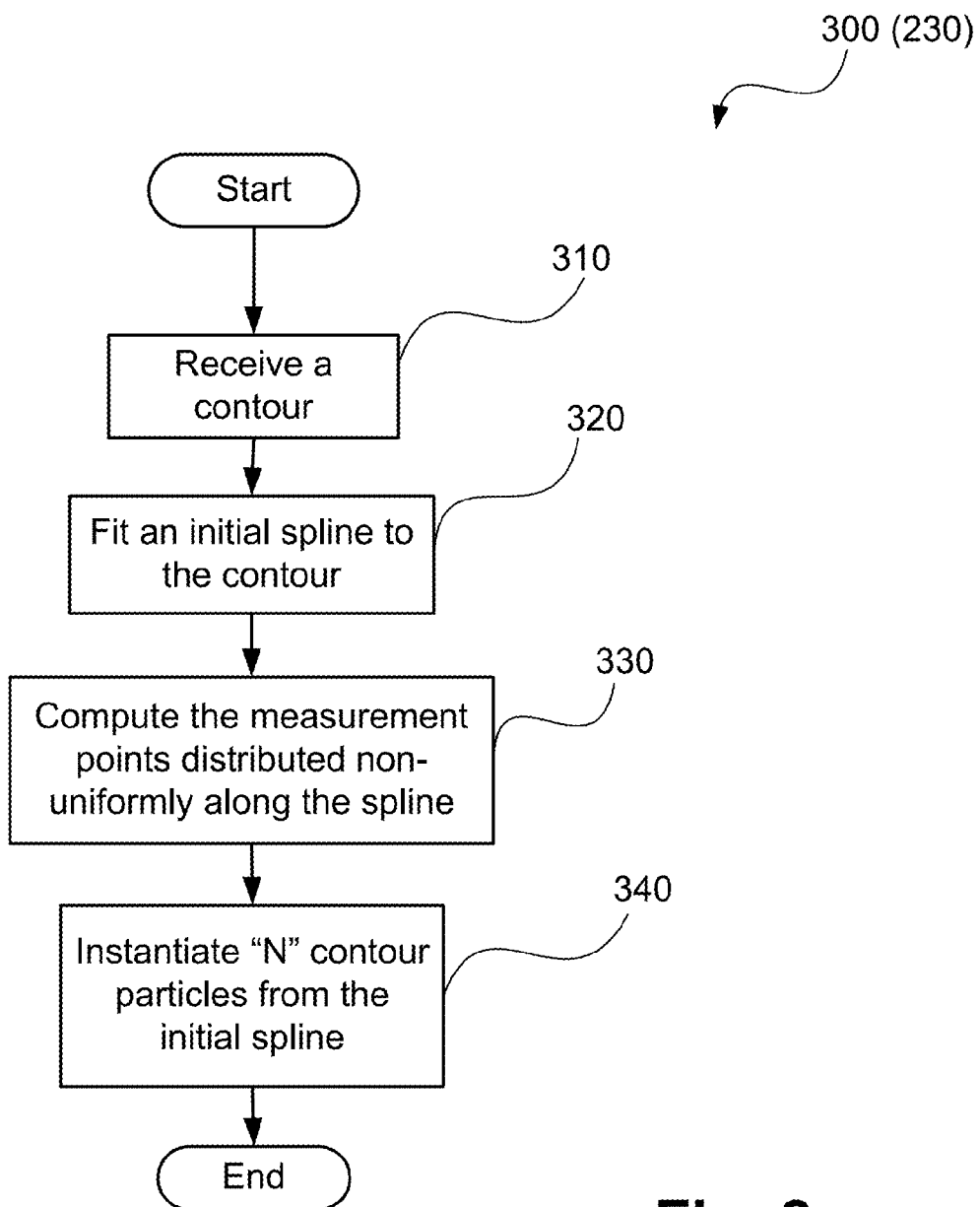
FIG. 3 is a flow diagram illustrating a method of initialising a contour tracker.
Figure 15:
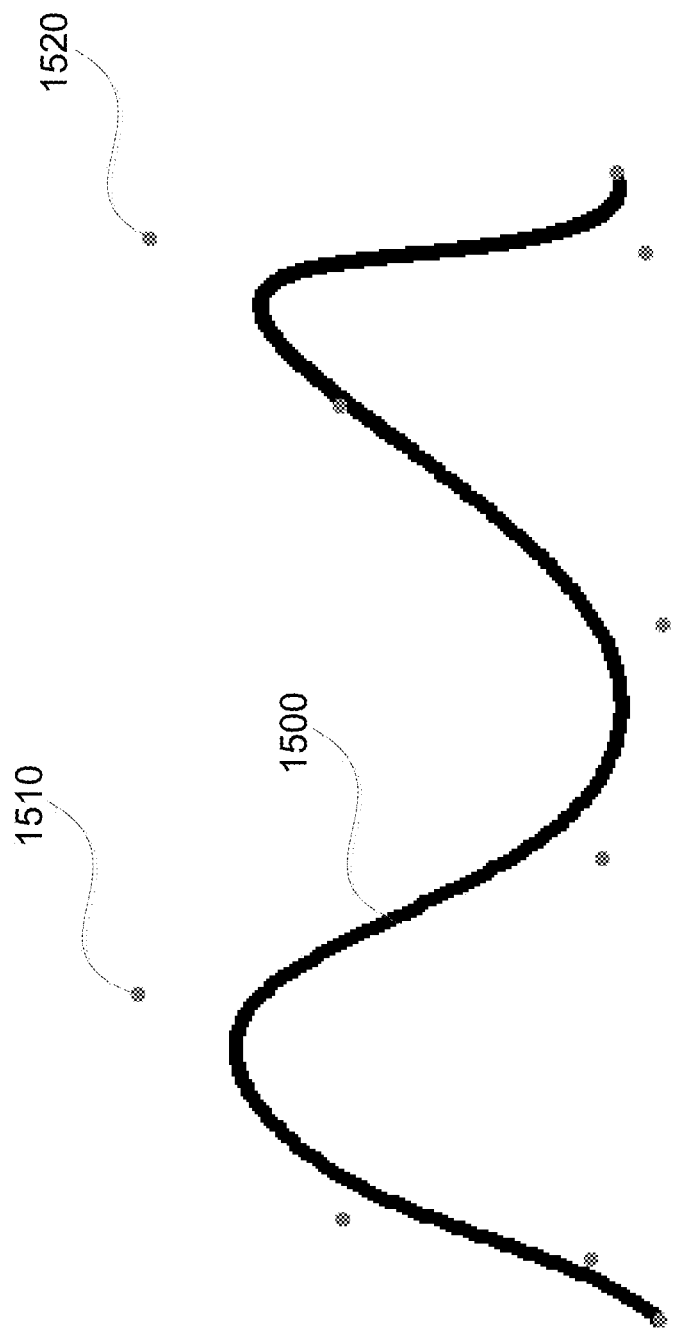
FIG. 15 is a schematic diagram illustrating a spline curve and its control points.

FIG. 3 shows a method 300 representing a preferred implementation of the initialisation step 230. The method 300 begins with a receiving step 310 in which a contour 500 is received. The received contour 500, extracted at step 220, is represented by the pixel level contour which is an array of pixel coordinates, also known as connected pixels, e.g. {(100,200),(101,200),(101,201)}, where the pairs of number are the x- and y-coordinates of the pixels. In one arrangement, the tracking system does not directly operate on a pixel level contour 500. Instead, a model represents the pixel level contour 500. In the preferred arrangement, in step 320 a cubic B-spline is fitted to the received contour 500 using least-squares spline approximation. The B-spline of n-th degree, e.g.: degree of 3, that is fitted to the received contour, is also referred to in this document as the initial spline. A B-spline example 1500 that is fitted to the curve 500 of FIG. 5, is shown as in FIG. 15.

There are several advantages to storing a spline representation 1500 of the contour, as compared to storing the pixel level contour 500. One advantage is that splines are represented using control points, e.g. 1510 and 1520, and the number of control points is far less than the number of pixels of a typical contour 500. Typically, 10 control points are sufficient for a cubic B-spline whereas a typical contour segment 500 has hundreds of pixels. This enables efficient application of geometric transformations, such as rotation or scaling. Another advantage of using splines is that splines are a mathematical model which allows operation on infinite sub-pixel accuracy of a curve. Such accuracy is not achievable using a pixel level contour 500.

After a spline is fitted to the contour 500, the tracking system then computes, at step 330, a number of measurement points along the spline. The determined measurement points, such as measurement points 630, 640, 650 seen in FIG. 6 for the contour 500, are distributed along the spline curve in a non-uniform manner, in that the distance between adjacent measurement points varies. The non-uniform distribution takes advantage of knowledge that more information about the contour occurs at those locations of more or relatively high curvature. The spline measurement points are therefore biased to those locations. A qualitative example of this is seen in FIG. 17A. The measurement points are computed at this stage of the method 200 so that the observation likelihood can be computed by reusing these measurement points, and the same distribution thereof, during tracking.

The same distribution of measurement points, determined from the contour pixel information in the initial frame is used in each of the predictions. This is particularly seen in FIGS. 17A and 17B where the first measurement points determined for the real curve of FIG. 17A, are reused in each hypothesised curve of FIG. 17B. Most notably, each hypothesised (predicted) curve of FIG. 17B has the same number of measurement points as that of FIG. 17A (fifteen (15) in this example), and the same distribution of those measurement points is maintained in the second measurement points of the predictions. As seen, some measurement points are identified by number based on position along the unit length of each curve, where the ends are at (0.0 and 1.0). In FIG. 17A for the original curve, the first measurement points are biased toward the significantly curved part, exemplified by measurement points enumerated at 0.3, 0.5 and 0.65. In the predictions of FIG. 17B the same distribution is maintained for each prediction. For the predictions 1710, 1712 and 1714, the (second) measurement points are seen to still be generally biased to the parts of greater curvature. However, with the prediction 1716, because of the substantial flattening of that prediction, the (second) measurement points are now, according to the original distribution, focussed upon a substantially flat part whereas a more curved part, in the vicinity of unit length 0.8, has no measurement points. This clearly therefore depicts an example of the same distribution of measurement points being maintained for all predictions. The detail of computing the measurement points is presented in FIG. 4 and discussed in future sections.

Finally, the method 300 instantiates "N" contour particles from the initial spline, at step 340. At step 340, all contour particles are initialised with the same control points, referred to as initial control points, as the initial spline and all contour particles have their weights initialised to, for example, zero. In one arrangement the number "N" is a fixed number, say 200. In another arrangement, the number "N" is a parameter inputted by an end user. In yet another arrangement, the number "N" is a parameter that can be set based on the content of the video. For example, where the background is smooth, "N" can be set to 100, and otherwise "N" is set to 300. In another example, the number "N" is a parameter that is set based on the available computational resources, e.g. if a frame rate of 30 frames per second needs to be achieved, "N" can be set to 150, but if a frame rate of 15 frames per second needs to be achieved, "N" can be set to 300. The setting of "N" can thereby be computed based upon parameters determined from the video.

Figure 4:
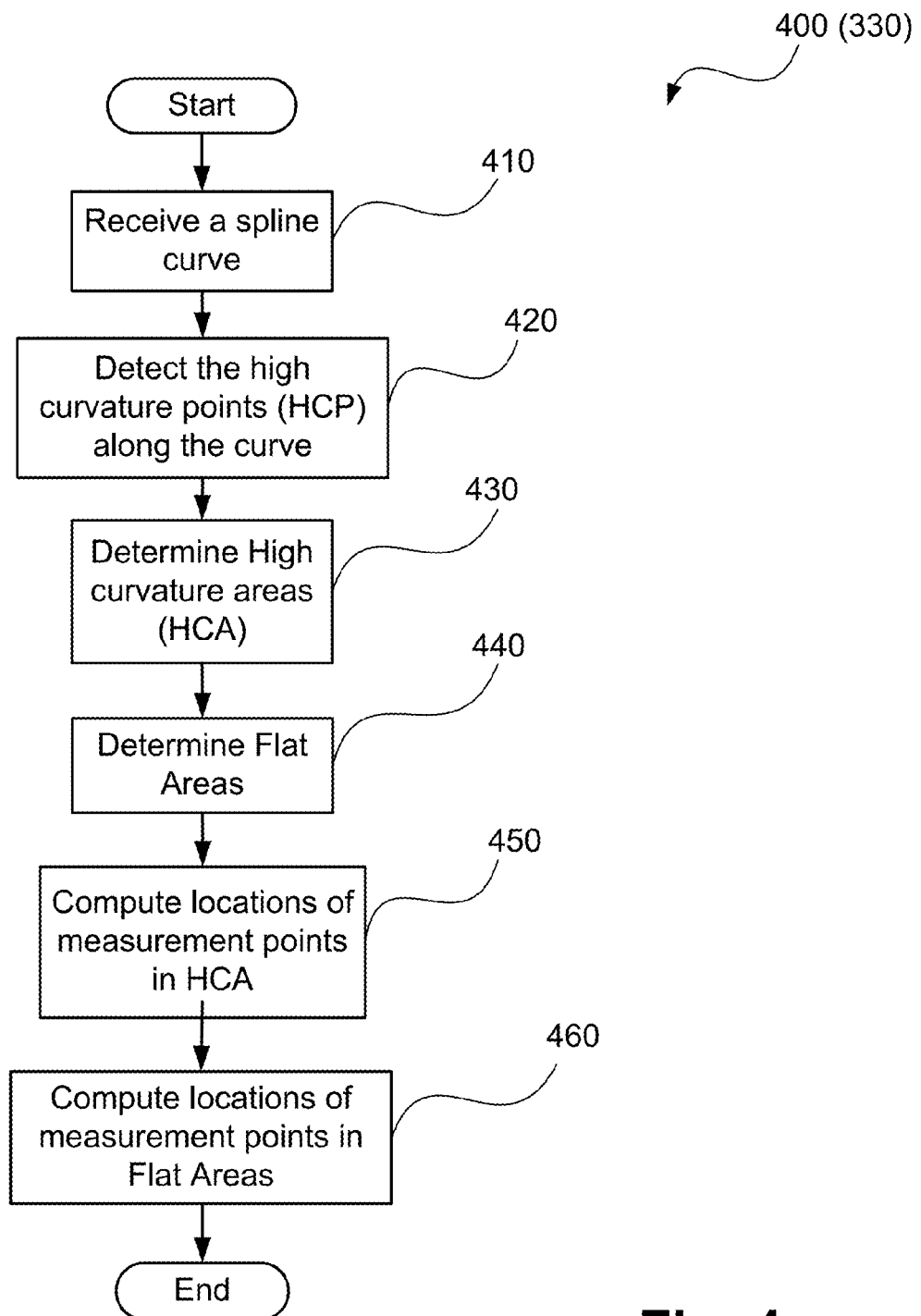
FIG. 4 is a flow diagram illustrating a method of computing measurement points of a contour.
Figure 6:
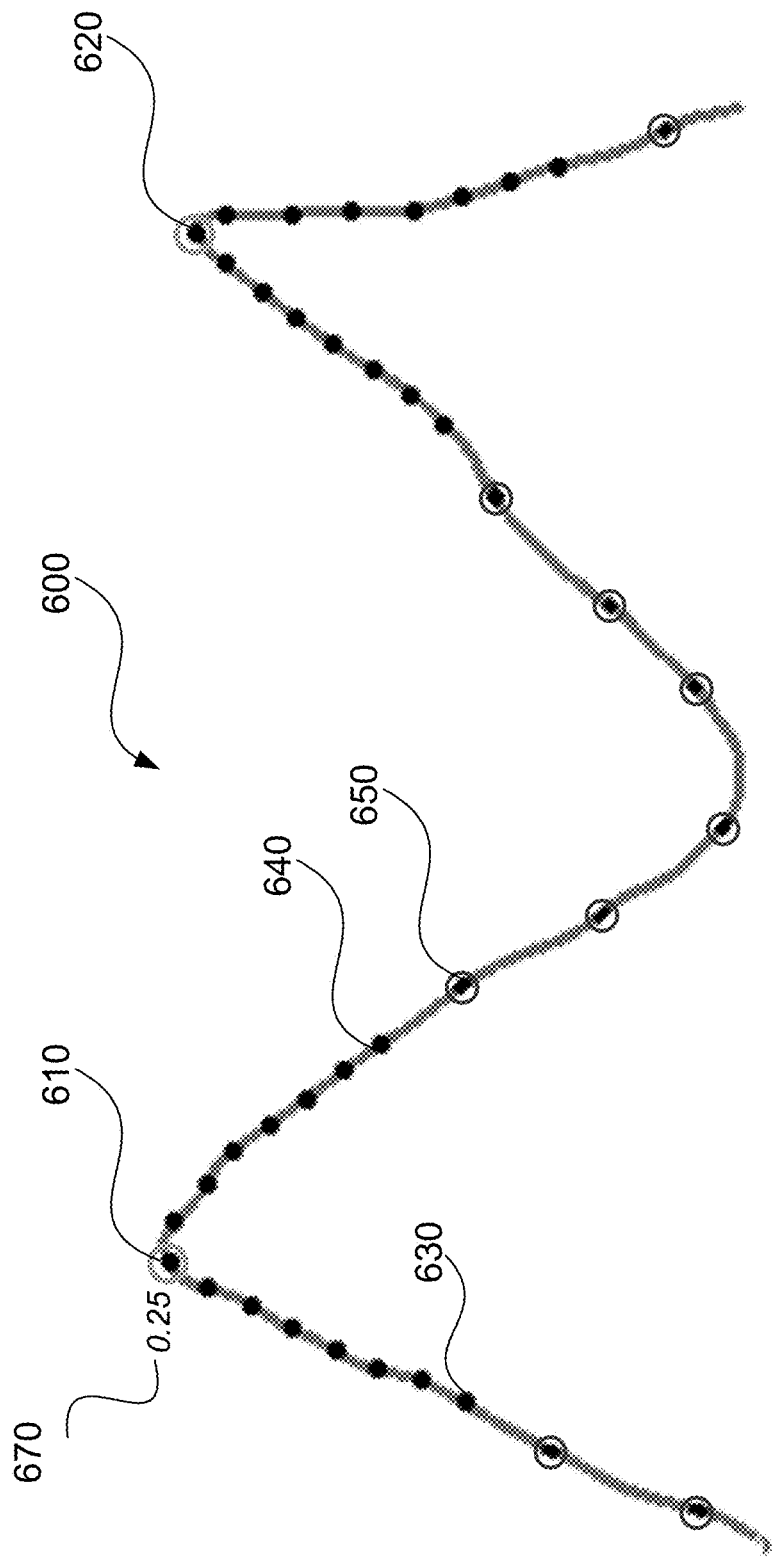
FIG. 6 is a schematic diagram illustrating the exemplar measurement points determined along a contour.

FIG. 4 shows a method 400, which details a preferred implementation of the measurement points computing step 330. The method 400 begins with step 410, in which a spline 1500 as estimated in step 320, is received. The method 400 then moves to step 420 where a set of points, called High Curvature Points (HCPs) in this description, are detected. A High Curvature Point (HCP) refers to a point on the curve that is "bended more sharply" compared to its neighbouring points. HCPs therefore represent relatively high information portions of the contour or curve, particularly when compared to flatter or straighter portions of the curve. A number of methods for HCP detection are known and one approach that may be used is known in the art as "IPAN99", as proposed by Dmitry Chetverikov in 1999. The detected HCPs for a contour are formed into a list which is stored in the memory 106 for later use. An example of the HCPs for the contour segment 500 is found in FIG. 6. In FIG. 6, two HCP's 610 and 620 are highlighted in black dots with grey circles. These two HCP's are located on the sharpest corner of the curve. The HCP 610 has a value 670 in this example represented by the number 0.25, which indicates the unit location of the point 610 along the length of the curve, the start of the curve having a value 0.0 and the end having a value 1.0.

Next, the method 400 moves to step 430 where a High Curvature Area (HCA) is determined by the processor 105. An HCA is an area centred on a HCP. An example of the HCA is found in FIG. 5. In FIG. 5, darker or black sections 510 and 520 are the HCA determined on the curve 500.

Notice that on two ends 560 and 570 of the black section 510 are two numbers, 0.125 and 0.375. They are unit magnitude values indicating the start point and end point of the HCA. The purpose of the HCA is to define a spatial extent around a HCP which allows more measurement points to be obtained compared to non-HCA areas of the spline. A high curvature area may also be referred to as the High Information portion of the curve. The width of an HCA is decided based on the number of HCPs detected at step 420. The detail of a process for determining HCA area width and sampling density is presented in FIG. 7 and discussed elsewhere.

Next, the method 400 moves to step 440, in which the non-HCA areas are determined. The non-HCA areas are those parts of the curve that are not HCA areas, and therefore complement the HCAs. These areas are also referred to as Flat Areas. The number of measurement points in the flat areas of the curve is less than the number of measurement points in HCA's. In other words, measurement points are sampled more sparsely in flat areas. An example of the flat areas is shown in FIG. 5. In FIG. 5, sections 530, 540, 550 are the flat areas determined on the curve 500. Details of a preferred process for determining flat areas and their sampling rate is presented in FIG. 8 and discussed elsewhere.

Next, the method 400 moves to step 450 where the processor 105 computes the locations of the measure points in HCA along the curve. Computation of the measurement point locations in HCA is based on the HCA width and sampling density calculated in step 430 and results in the measurement points being biased to the relatively high information portions of the contour. Detail of a preferred process for this is presented in FIG. 9 and discussed elsewhere.

Next, the method 400 moves to step 460 where the processor 105 operates to compute the locations of the measurement points in flat areas along the curve. Computation of the measurement point locations in flat areas is based on the flat area width and sampling density calculated in step 440. Detail of a preferred approach for this is presented in FIG. 10 and discussed elsewhere.

Figure 7:
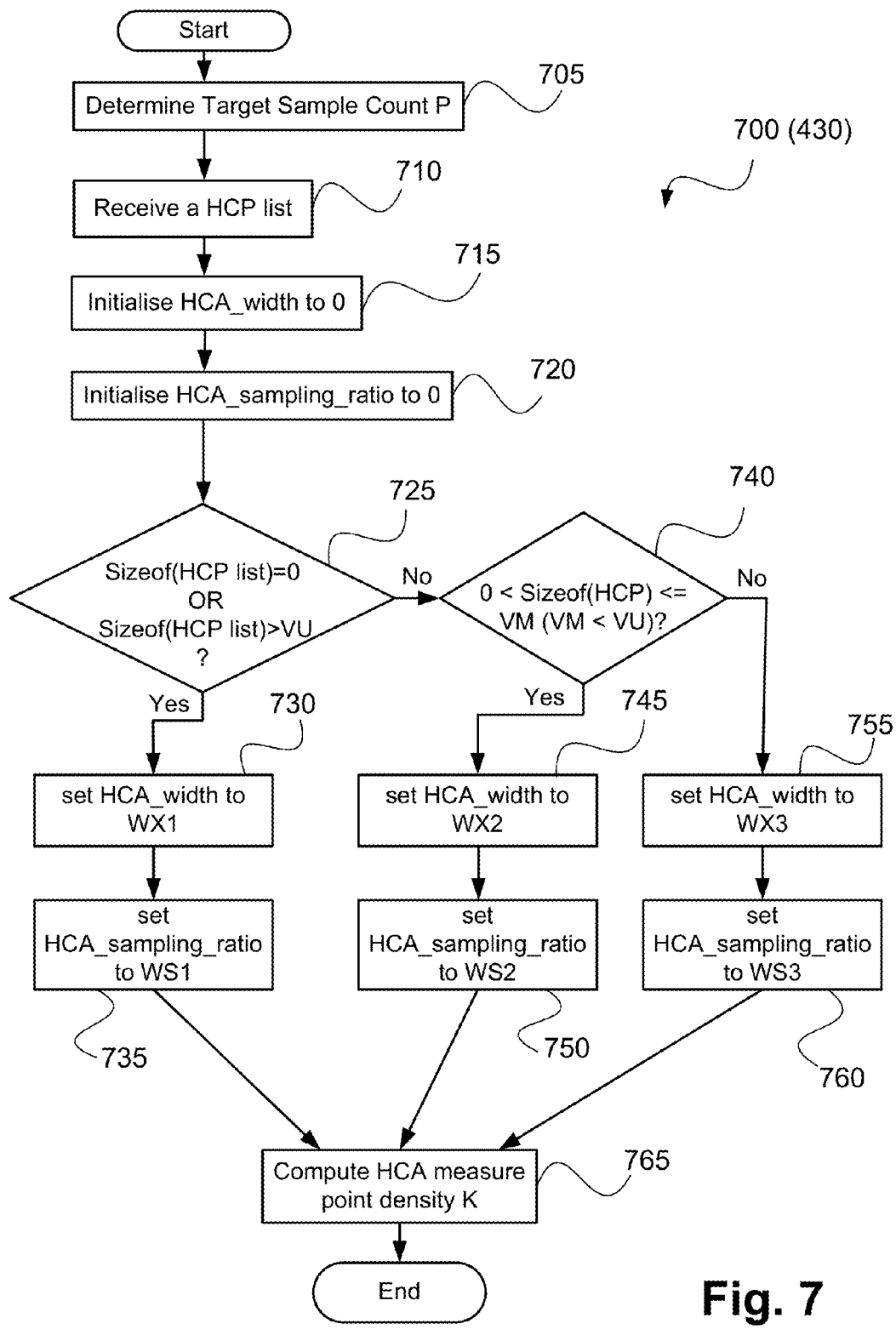
FIG. 7 is a flow diagram illustrating a method of determining high curvature areas of a contour.

FIG. 7 shows a preferred method 700 for computing HCA width and HCA measurement point density as required by step 430.

The method 700 begins with step 705, which a target sample count P is determined by the processor 105. In one arrangement, the target sample count P is predetermined by a user and typically set to 50. Alternatively, P can be determined by satisfying a balance between the available computing resource (e.g. the speed of the processor 105 and the amount of available memory 106) and required process efficiency (how long the user will wait for an output). For example, if a frame rate of 30 frames per second needs to be achieved, P is set to 25, but if a frame rate of 15 frames per second needs to be achieved, P is set to 50. The target sample count specifies the maximum number of measurement points.

Next, the method 700 moves to step 710, where the processor 105 receives the HCP list, computed in step 420, for example from storage in the memory 106. Then the method 700 moves to Initialisation steps 715 and 720, in which values of two variables HCA_width and HCA_sampling_ratio, as stored in the memory 106, are respectively set to the number zero by the processor 105. HCA_width stores a floating point number between 0 and 1, and represents the width of a high curvature area as a percentage of the entire curve, e.g.: an HCA_width of 0.3 means 30% of the entire curve. HCA_sampling_ratio is the ratio between the number of measure points obtained in a high curvature area and the number of measurement points that a uniform sampling would produce. For example, an HCA_sampling_ratio of 1.5 indicates the amount of measurement points obtained from a high curvature area is 1.5 times of the amount of measurement points if obtained uniformly from the same area.

Next, the method 700 moves to a checking step 725. If the number of HCPs, represented by a variable Q, is 0 or greater than a threshold value VU, say 5 points, then the value of HCA_width is set to a variable WX1, say 0, at step 730, and the value of the HCA_sampling_ratio is set to a variable WS1, say 0, at step 735 (step 725=yes). In other words, when Q is zero or exceeds the upper limit value VU, the contour is treated as a relatively flat line, e.g. straight. Measurement points are sampled at a uniform distance for the entire contour. The value of VU can be determined in a number of ways. In one arrangement, VU is a predetermined value and entered as a parameter input to the tracking system. In another arrangement, VU is computed as a ratio of the target sample count P. e.g., VU is 10% of P. In another arrangement, an application first detects all the edges in the scene. Then the application determines the median and maximum number of HCPs of the detected edges. Finally VU is set to the mean value between the median and maximum number of HCPs of the detected edges, rounded down to the nearest integer. For example, the median number of HCPs of detected edge is 3 and maximum number of HCP is 10, VU=(10+3)/2, which is 6.

If Q is greater than 0 and less than VU or equal to VU (step 725=no), the method 700 moves to another checking step 740. In step 740, if Q is less than or equal to a predetermined value VM, say 2, (step 740=yes) then the values of HCA_width and HCA_sampling_ratio are set to WX2, say 0.2, and WS2, say 1.5, at steps 745 and 750 respectively. The value of VM is strictly less than the value of VU. In other words, if one or two HCP were detected on a curve, each high curvature area occupies 20% of the entire curve, and there should be 1.5 times more measurement points sampled from HCA. As a result, a total of up to 40% of the curve is in high curvature areas and 60% of the final measurement points are obtained from high curvature areas.

If Q is greater than VM and less or equal to VU (step 740=no), then the method 700 goes to the setting steps 755 and 760, in which HCA_width and HCA_sampling_ratio are set to WX3, say 0.15, and WS3, say 1.3, respectively. As a result, a total of up to 75% of the curve is covered in high curvature areas and up to 97% of the final measurement points are obtained from the high curvature areas.

Following from each of steps 735, 750 and 760, the method 700 moves to a computing step 765 where the processor 105 evaluates a final HCA measurement points density K, determined according to the equation:

$$K = HCA\_width * P * HCA\_sampling\_ratio$$

where K is the final HCA measurement point density and P is the target sample count. In other words, the HCA measurement points density equation provides for computation of the number of measurement points per HCA area. Once the value K is computed, the method 700 (step 430) ends.

Figure 8:
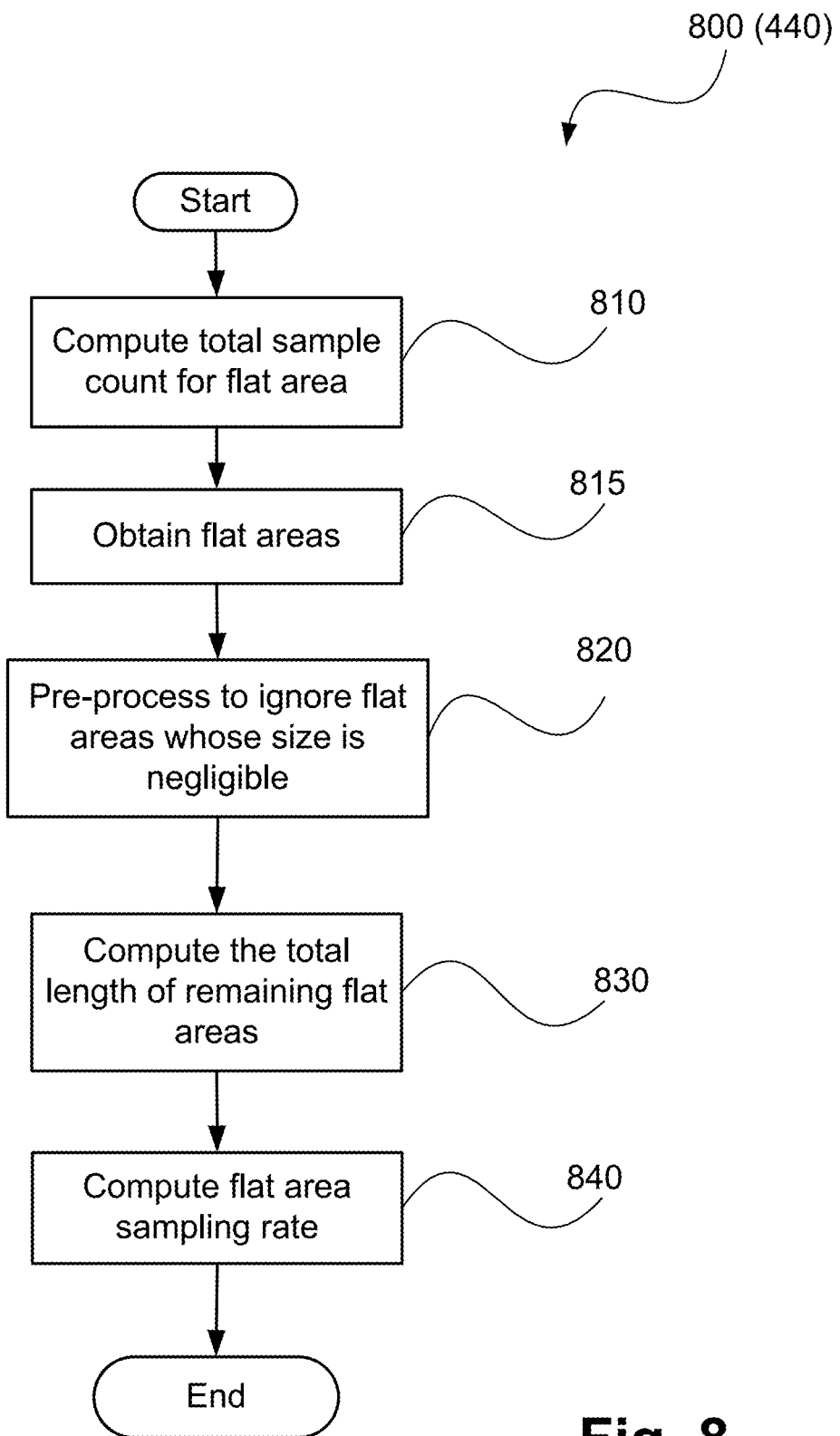
FIG. 8 is a flow diagram illustrating a method of determining flat areas of a contour.

FIG. 8 shows a method 800 that elaborates on step 440. In the method 800, a preferred evaluation of the flat area measurement point sampling rate is described. In principle, measurement points are located at regular intervals along the flat areas of the curve.

The method 800 begins at step 810 where the processor 105 computes the total amount of measurement points for flat areas, K_flat, using the following equation:

$$K\_flat = \begin{cases} 0 & \text{if } K*Q > P \\ P - (K*Q) & \text{otherwise} \end{cases}$$

where P is the target sample count, Q is the number of high curvature points detected at step 420, which also indicate the number of high curvature areas. K is measurement point density of HCA. Care needs to be taken so that K*Q is not greater than P. In one arrangement, if K*Q is greater than P, then K_flat is set to 0. As a result, no measurement points are obtained from flat areas of the curve.

Next, the method 800 moves to step 815, in which all flat areas are obtained. Since flat areas are any section of the curve that is not a high curvature area, and all the high curvature areas are known, i.e., their start and end points are known, the preferred implementation starts from the beginning of the curve, and searches through the entire curve for any section of the curve that is not high curvature area.

Next, the method 800 moves to a pre-processing step 820, in which all flat areas with negligible size are ignored. In one implementation, this is achieved by first computing the average length of flat areas, then iterating through all flat areas and setting the ignore flag for the flat areas that are below a threshold value TV. In one arrangement, TV is set to ¼ of the average length of flat areas. Step 820 is desired so that samples are not obtained from flat areas that are too small. Such small flat areas typically exist in between two HCA.

The method 800 then moves to step 830 where the processor 105 is operated to compute the total length TL of remaining flat areas. The remaining flat areas are referred to as flat areas with significant length. In one approach, TL is computed by iterating through all the flat areas and accumulating only the flat areas with significant length. Finally the sampling rate FS is computed by the processor 105 at step 840 by dividing TL with K_flat. The method 800 then ends.

Figure 9:
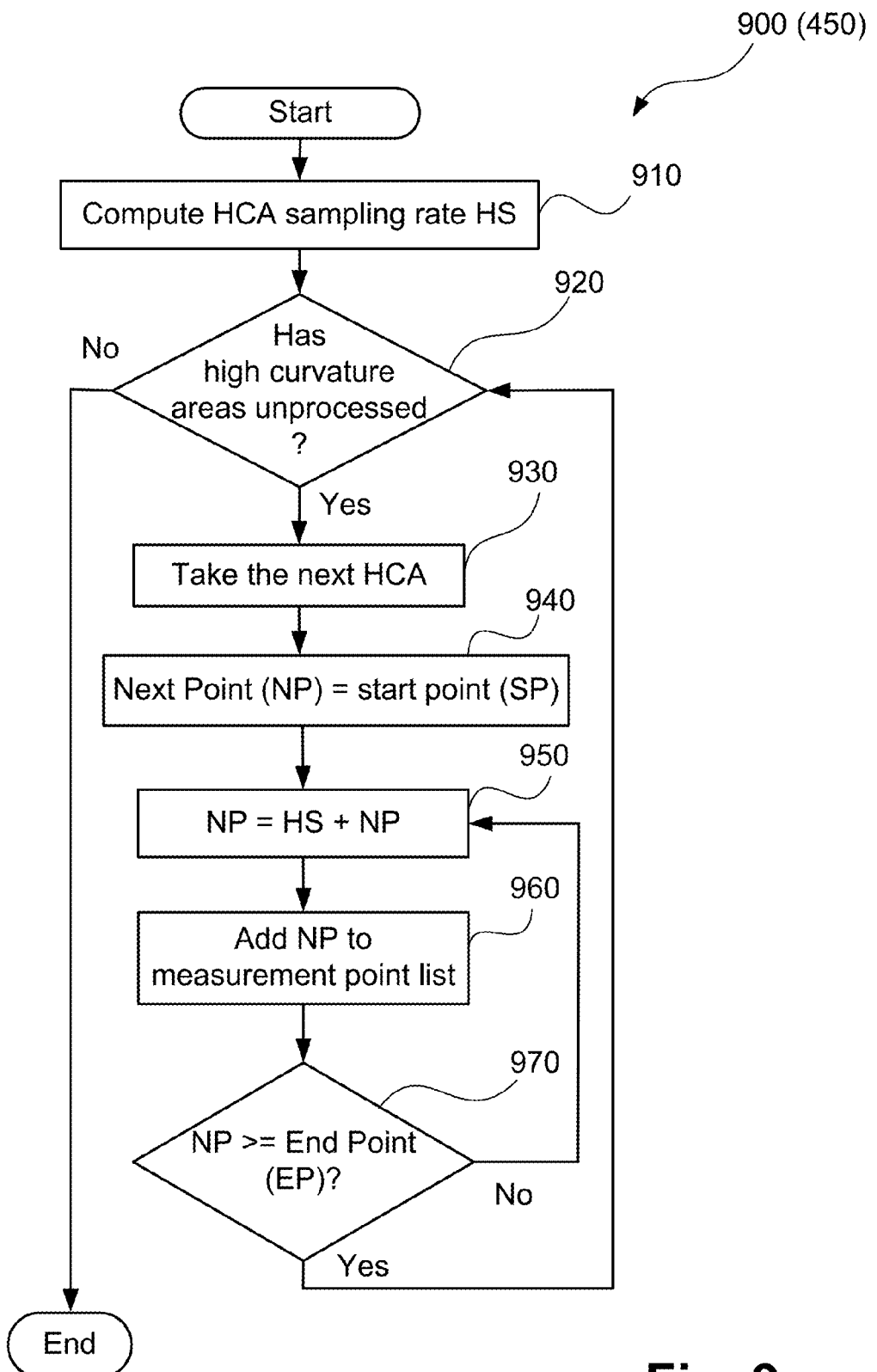
FIG. 9 is a flow diagram illustrating a method of computing measurement points in all high curvature areas.

FIG. 9 shows a method 900 representing a preferred implementation of step 450 by which the processor 105 computes the values of measurement point in HCA areas. The method 900 begins with step 910, where the processor 105 computes a sampling rate HS. Desirably, HS is computed by dividing the HCA_Width with HCA density value K, as computed at step 765.

Next, the method 900 moves to step 920 where the processor 105 checks if there are any more high curvature areas to be processed. If there remain unprocessed HCA, the method 900 moves to step 930. At step 930, the next HCA is obtained. As shown in FIG. 5, a HCA 510 has a start point 560 and an end point 570 whose values are 0.125 and 0.375 respectively.

Next, the method 900 moves to step 940 which operates to initialise the value of the next measurement point, NP, to the value of start point SP. This creates a measurement point list that is preferably maintained by the processor 105 by storage in the memory 106. Next, the method 900 moves to a computing step 950, where the processor 105 updates the NP value by adding HS. As a result, NP points to the next measurement point 630. Next the value of NP is added to the measurement point list at step 960. The value of NP is then compared to the value of End Point EP, e.g. 570, of HCA at step 970. Where the value of NP is greater or equals to EP, the processor 105 causes the method 900 to loop back to step 920. Otherwise, the method 900 loops back to the computing step 950 to acquire another measurement point in the same HCA, thereby incrementally determining the location of the next measurement point for the HCA in question. This is repeated for all measurement points in the HCA. Where the processor 105 determines, at step 970, that there are no more HCA to be processed at step 920, the method 900 ends.

An example of a list of resulting measurement points is shown in FIG. 6. In this figure, all the black dots on the curve without circles are measurement points 630, 640 on high curvature areas.

Figure 10:
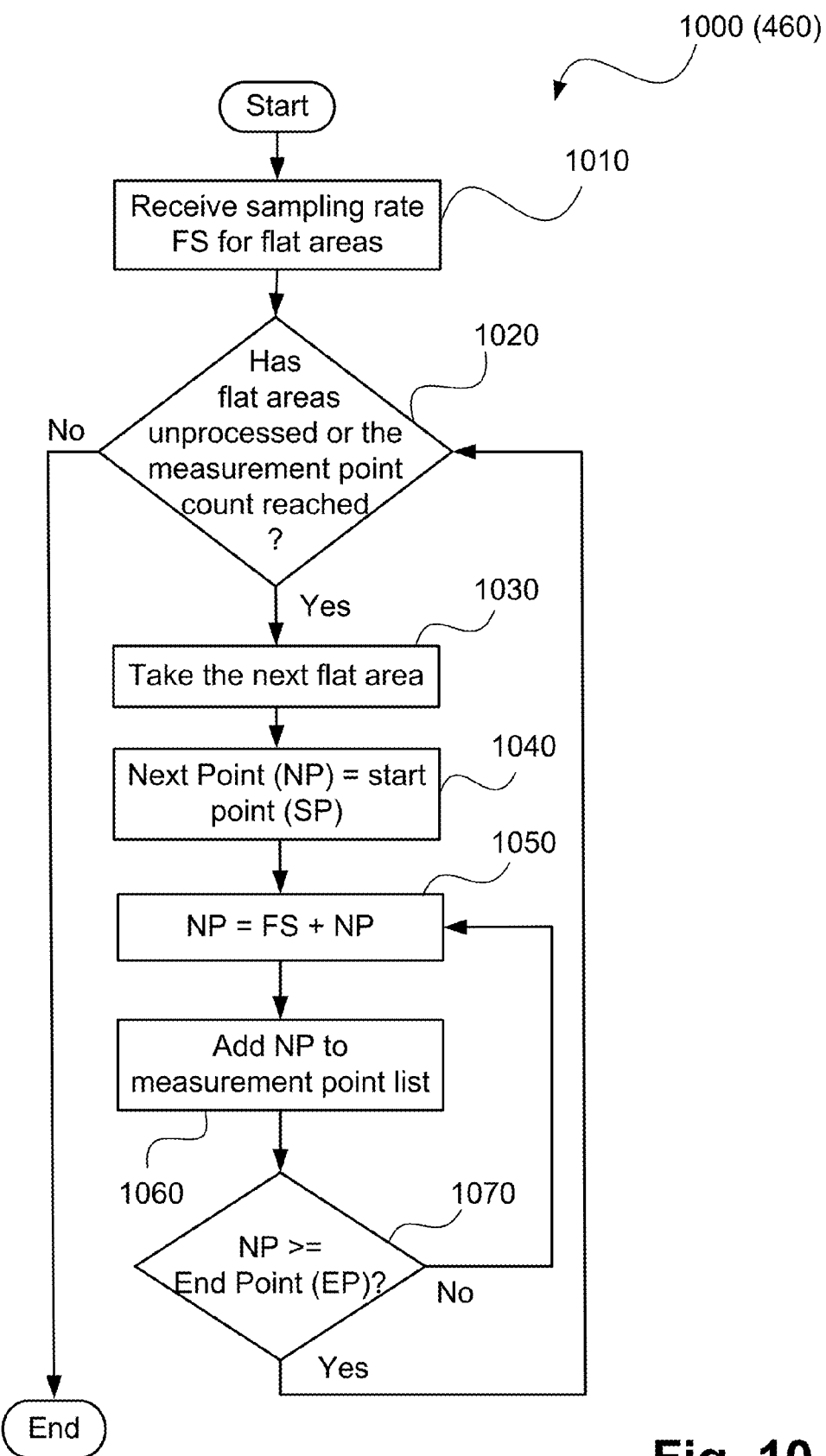
FIG. 10 is a flow diagram illustrating a method of computing measurement points in flat areas.

FIG. 10 shows a method 1000 representing a preferred implementation of step 460. In this figure, the processor 105 operates to compute the values of measurement points in flat areas. The method 1000 begins with step 1010, where the processor 105 extracts and receives the sampling rate as computed at step 840.

Next, the method 1000 moves to step 1020 where the processor 105 checks if there are any more flat areas with significant length to be processed. If there are more flat areas unprocessed, the method 1000 moves to step 1030. At step 1030, the next flat area with significant length is obtained. Again, a flat area has a start point and end point. An example is shown in FIG. 5, in which the flat area 550 has a start point 580 with value 0.85 and an end point 590 with value 0.99.

Next, the method 1000 moves to step 1040 to initialise the value of the next measurement point NP to the value of start point SP. Next, the method 1000 moves to a computing step 1050, where the processor 105 updates the NP value by adding FS, e.g., NP is now pointing to the black dot 650. Next, the value of NP is added to the measurement point list at step 1060. This measurement point list is the same list described at step 960. Next, the value of NP is compared to the value of End Point (EP) of flat area at step 1070. If NP is greater or equals to EP, the processor 105 causes the method 1000 to loop back to checking step 1020. Otherwise, the method 1000 loops back to computing step 1050 to acquire another measurement point in the flat area, thereby iteratively incrementally determining the location of the next measurement point for the flat area in question. Where there are no more flat areas or P is reached, the method 1000 ends.

Figure 11:
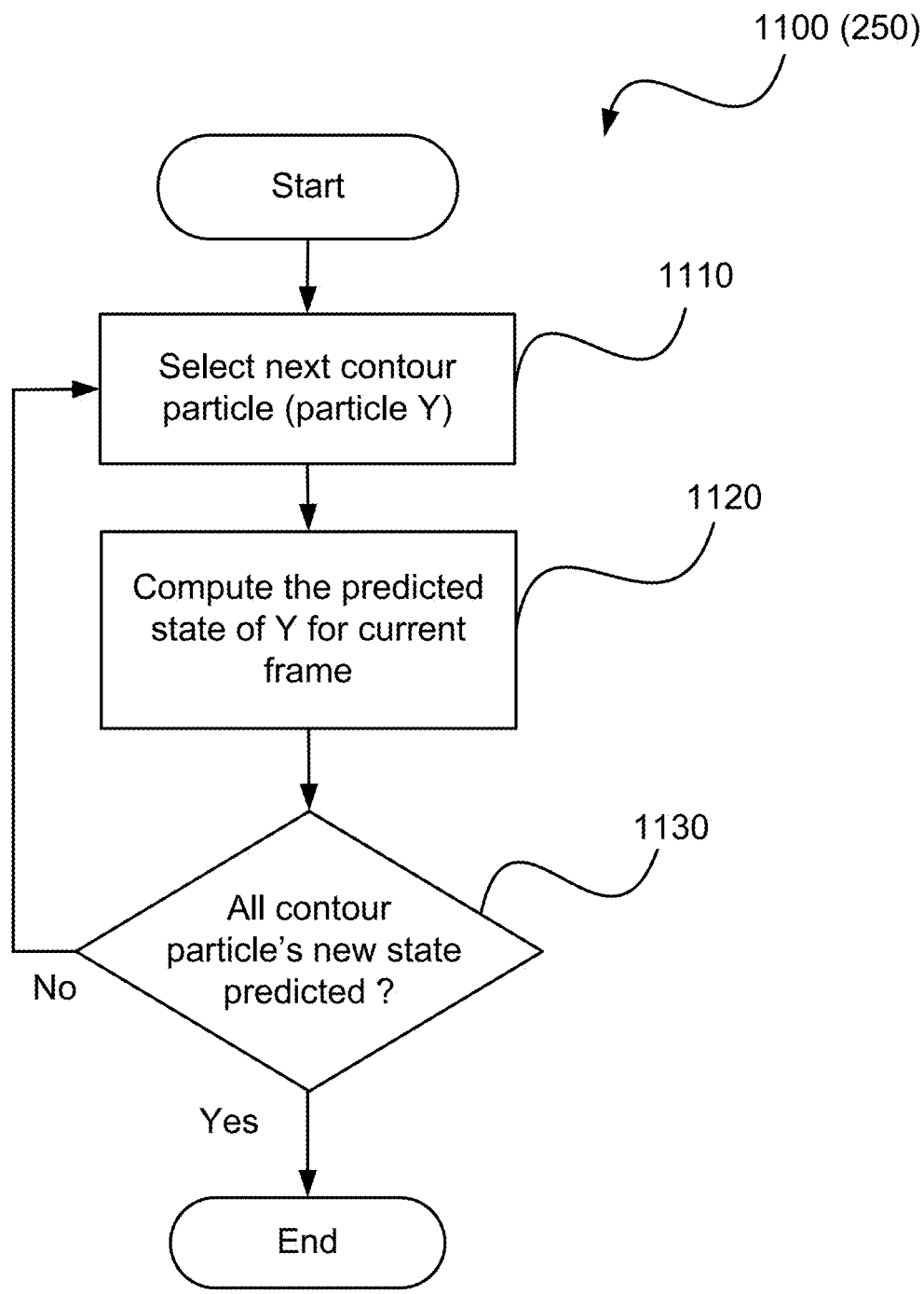
FIG. 11 is a flow diagram illustrating a method of predicting the new states for all contour particles.

FIG. 11 shows a method 1100 which represents a preferred implementation of the prediction step 250. The method 1100 begins with step 1110, where the processor 105 selects the next contour particle, referred to as particle Y. Next, the method 1100 moves to step 1120 where the processor 105 computes the predicted state of particle Y for current frame. In one arrangement, the predicted state of particle Y is computed using a standard Random Walk method. Random Walk is most applicable when there is no prior information about the motion of the object (target) in question. In another arrangement, the new state of particle Y can be computed using a Second Order Auto-regressive method. The Second Order method is more powerful than Random Walk and is appropriate when a past estimate of the target motion is available. These approaches preferably each operate to estimate one or more splines of the contour of the subsequent image frame. Next, the method 1100 moves to step 1130 to check if the state of all particles have been updated by the prediction process. Where more particles' state need to be updated, the method 1100 loops back to step 1110. Otherwise, the method 1100 ends. With this approach, the prediction of contour, in a subsequent frame, and the splines by which that contour is predicted, is performed independently of image content of the subsequent frame, instead being performed using the source or initial contour arising from the initial frame.

Figure 12:
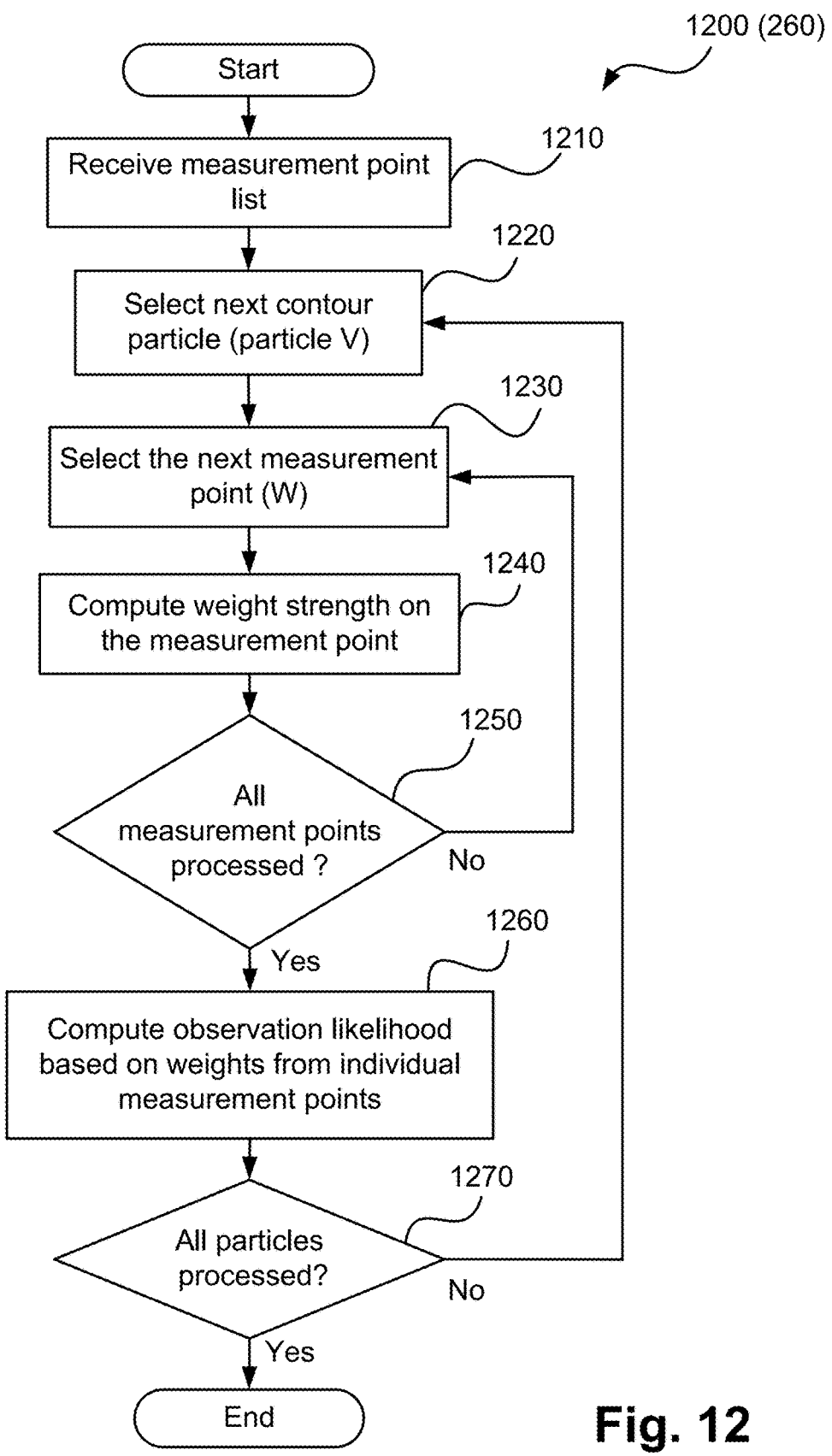
FIG. 12 is a flow diagram illustrating a method of computing observation likelihood for all contour particles.

FIG. 12 is a flowchart of a method 1200 representing a preferred implementation of the observation step 260 for computing the observation likelihood for all the contour particles. This is essentially a determination of the quality of predictions in a second or subsequent frame of a curve or contour from a first frame. Observations are performed against real image data of the current frame. The method 1200 begins with step 1210, where the processor 105 receives the measurement point list determined at step 330 and associated with the first frame. Next, the method 1200 moves to step 1220 where the processor 105 selects the next contour particle V. At step 1230, the processor 105 selects the measurement point W from the measurement point list received at step 1210.

Next, the method 1200 moves to the step 1240 where the processor 105 computes the weight on the measurement point W. The details of computing the weight on a single measurement point is presented in FIG. 13 and is discussed elsewhere. Next the method 1200 moves to step 1250, where the processor 105 checks if all measurement points have been processed. If not, the method 1200 moves back to 1230. Otherwise, the method 1200 moves to step 1260, in which the observation likelihood of the whole contour particle (i.e. an estimated contour of a subsequent frame) is computed by the processor 105. Under the notion that all the weight values computed in step 1240 are independent of each other, in one arrangement according to step 1260, the product of these weight values represents the observation likelihood for a given particle V.

Next, the flow moves to step 1270 where the processor 105 checks if all particles are processed. If not, then the method 1200 loops back to step 1220 to process another contour particle. Otherwise, the method 1200 ends.

Figure 13:
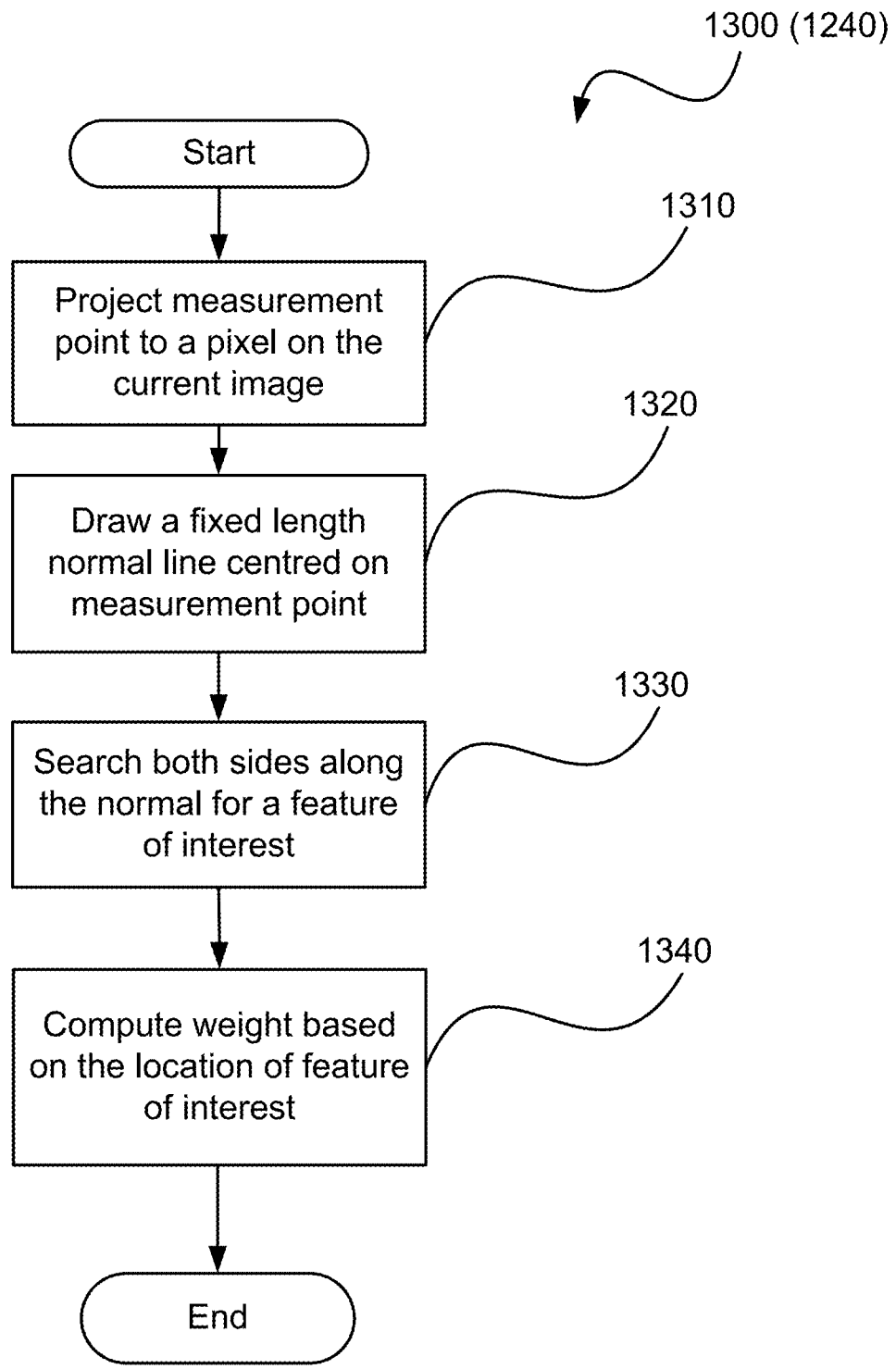
FIG. 13 is a flow diagram determining illustrating a method of computing weight on one measurement point for one contour particle.

FIG. 13 shows a flowchart of a method 1300 representing a preferred implementation of step 1240 to compute weight strength on a measurement point. The method 1300 begins with step 1310, in which the measurement point is "projected" into the current input image. The input image in this instance was that obtained in step 240, and is a next frame in the video sequence. Essentially a first measurement point of the first frame (the frame captured or received at step 210) is projected to a corresponding second measurement point of the second frame (frame X of step 240). By project into the input image, what is meant is that a measurement point is a number representing a positional value on a hypothesised curve. However for the purpose of computing a weight, the positional value needs to be mapped to a pixel location in a 2D image. In one arrangement, a pixel positional value for a measurement point in a cubic spline is computed by the processor 105 using the Horner's rule and a forward differencing method.

Next, the method 1300 moves to step 1320, where the processor 105 virtually draws a line normal to the curve and that is centred on the pixel representation of the measurement point. The line normal has a width, say 20 pixels. Next, the method 1300 moves to step 1330, in which the processor 105 searches along the normal, on both sides of the curve, for a feature of interest, e.g.: the strongest gradient.

Next, in step 1340, the weight is computed by the processor 105 based on the location of the feature of interest. In one arrangement, the distance of the detected feature of interest identified at step 1330, $d_i$, is passed into a zero-mean normal distribution which gives the probability of the curve passing the location of the feature of interest.

The net result of the implementation of the steps of FIG. 12, which includes those of FIG. 13, is a set of second measurement points upon each predicted contour of a subsequent (second) frame of the video sequence, in which the second measurement points are same in number as those of the original contour of the initial frame and have the same non-uniform distribution.

Figure 14:
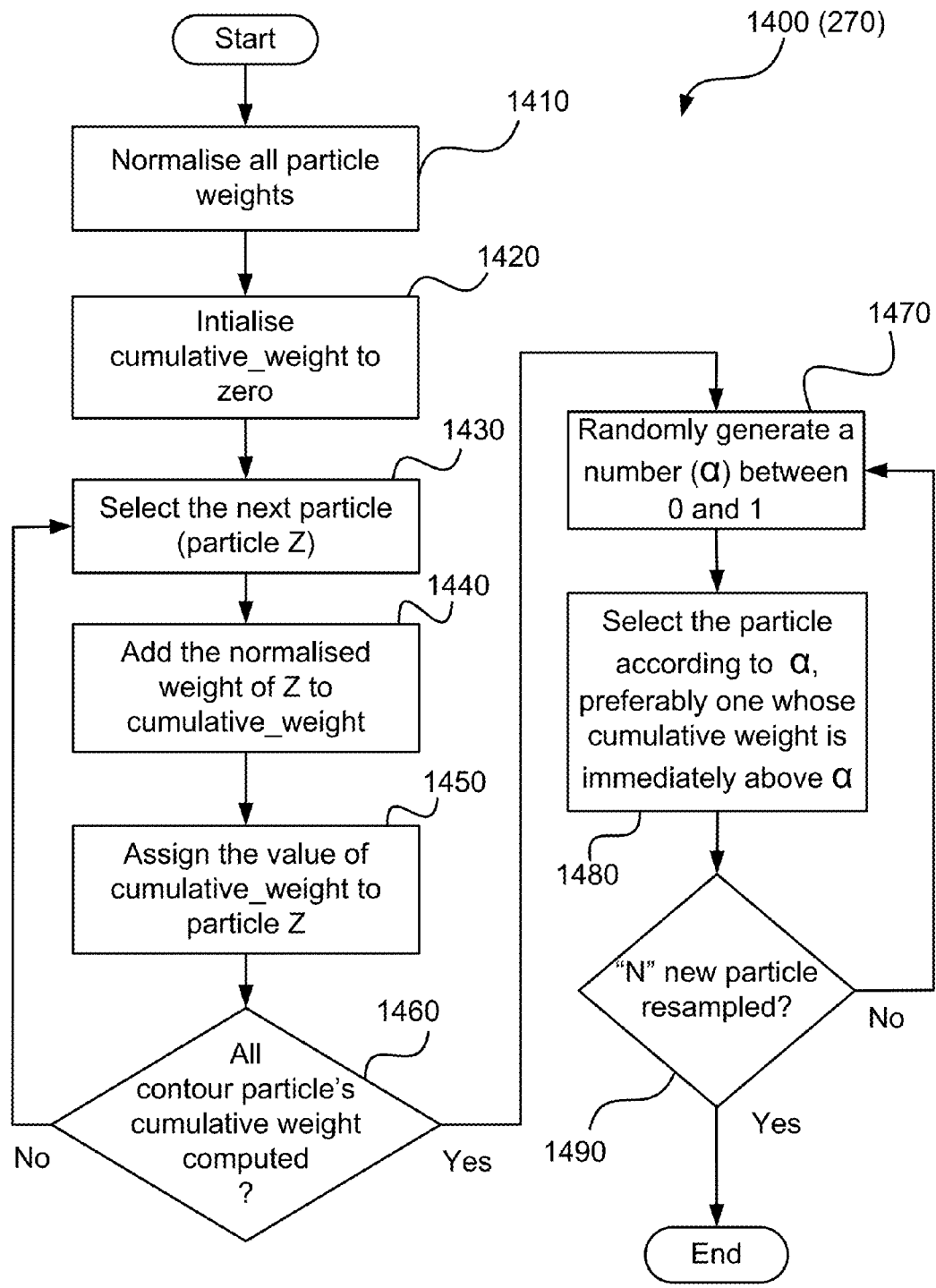
FIG. 14 is a flow diagram determining illustrating a method of resampling particles.

FIG. 14 is a flow diagram of a method 1400 which implements a preferred form of the resampling step 270. In principle, new particles are selected using importance resampling, as a standard technique used in particle filters, similar to a "wheel of fortune". More specifically, particles from the current frame X are placed on the wheel and the portion of the space that a particle occupies on the wheel directly corresponds to the weight of that particle. Selection of the next particle is made by spinning the wheel. A particle with a high weight has more chance of being selected for the next frame than a particle with a lower weight.

The method 1400 begins with a normalisation step 1410, where the processor 105 normalises the weights of all the particles so that they add up to one. Next, in step 1420, a value of a variable cumulative_weight is initialised to zero. Next, the method 1400 moves to step 1430 where the processor 105 selects the next particle, particle Z, to process. Next, in step 1440, the processor 105 adds the normalised weight of particle Z to the cumulative_weight. Next, the flow moves to step 1450 to assign the current value of cumulative_weight to particle Z. The operation of steps 1420 to 1450 is to effectively put particle Z onto the wheel, and the proportion of the wheel occupancy is directly related to the normalised weight of particle Z.

Next the method 1400 moves to step 1460 where the processor 105 operates to check if all the contour particles have been processed. If not, the method 1400 loops back to step 1430 to effectively put another particle on the wheel. Otherwise, the method 1400 moves to step 1470.

In step 1470, a random number, $\alpha$, is generated between 0 and 1. Next, in step 1480, the processor 105 operates to select a particle according to $\alpha$. In one arrangement, for a particle whose accumulative weight that is immediately greater than $\alpha$, this particle is resampled. Alternatively resampling may be performed in a particle whose accumulated weight is greater than or equal to $\alpha$. The steps 1470 and 1480 operate to effectively spin the wheel and select the particle at the location where the wheel stops.

Next, the method 1400 moves to step 1490 to check if N particles have been resampled. If not, the method 1400 moves back to step 1470. Otherwise, the method 1400 ends.

The method 1400 (270) of FIG. 14 accordingly operates to select, via the particles, at least one predicted contour of the second (subsequent) frame using a confidence measure, being the result of observations and the measurement model, determined from the second measurement points for each predicted contour. The selected particle and the corresponding contour can then be used to track the object associated with the contour in the second frame.

The described tracking method is suitable for tracking a contour or contour segment in an environment that is presented with a lot of background clutter. The tracking works well because the method computes observation likelihood based on the most distinguishing features for all particles (e.g. the high curvature area in the contour). In addition, the tracking method does not rely on any offline training step, making the method generic for any tracking scenario. Finally, computation of measurement points of a curve is done only once, i.e., at the initialisation stage, and same measurement points are reapplied to the all contour particles for subsequent frames, making the tracking computationally feasible to be used in real time application, and in a device with limited computational capacity, such as an embedded processing arrangements of a surveillance camera.

INDUSTRIAL APPLICABILITY

The arrangements described are applicable to the computer and data processing industries and particularly for the tracking of objects across a number of video frames.

The foregoing describes only some embodiments of the present invention, and modifications and/or changes can be made thereto without departing from the scope and spirit of the invention, the embodiments being illustrative and not restrictive.

We claim:

1. A method of tracking an object in a plurality of image frames, said method comprising:
receiving an initial contour associated with the object in a first one of the image frames, said initial contour representing an edge of the object;
determining a plurality of first measurement points distributed non-uniformly along the initial contour, said first measurement points being biased to relatively high information portions of the initial contour;
estimating a set of subsequent contours in a second one of the image frames, each of said subsequent contours being estimated from the initial contour;
determining an identical plurality of second measurement points along each of the set of estimated subsequent contours in the second image frame using the non-uniform distribution of the first measurement points in the first image frame; and
selecting at least one contour of the set of estimated subsequent contours using a confidence measure determined from the plurality of second measurement points as distributed along the selected subsequent contour, said selected subsequent contour being used to track the object in the second image frame.

2. A method according to claim 1 wherein the plurality of second measurement points for each of the estimated subsequent contours corresponds in number and distribution to the plurality of first measurement points of the initial contour.

3. A method according to claim 1, wherein the estimating of the set of subsequent contours comprises estimating splines of the subsequent contours independent of the second image frame.

4. A method according to claim 1, wherein the determining of the plurality of first measurement points comprises:
fitting an initial spline to said initial contour;
determining the first measurement points distributed non-uniformly along the initial spline; and
instantiating contour particles from the initial spline.

5. A method according to claim 4, wherein the determining of the first measurement points comprises:
detecting relatively high curvature points along the initial spline;
determining high curvature areas associated with the high curvature points;
determining flat areas along the spline complementing the high curvature areas; and
determining locations of the first measurement points in each of the high curvature areas and the flat areas along the spline.

6. A method according to claim 5, wherein the determining of the high curvature areas comprises:
determining a target sample count representing the number of measurement points to be located along the spline;
calculating a width of the high curvature areas representing that portion of the spline effected by high curvature points;
setting a sampling ratio representing a ratio of a number of measurement points in a high curvature area compared to a number of measurement points that a uniform sampling would otherwise produce; and
computing a density value representing a number of measurement points for each high curvature area of the spline.

7. A method according to claim 6, wherein determining the flat areas comprises:
determining a number of measurement points for flat areas based upon the target sample count, the number of high curvature points and the density value;
obtaining flat areas complementing the high curvature areas;
computing an accumulated length of the flat areas; and
computing a flat area sampling rate according to the computed accumulated length and the number of measurement points for flat areas.

8. A method according to claim 6, wherein the determining of the locations of the measurement points for the high curvature areas comprises:
computing a sampling rate for the high curvature areas from the width and the density value; and
for each high curvature area, establishing a start measurement point and iteratively incrementally adding the sampling rate to establish the location of a next measurement point for the high curvature area.

9. A method according to claim 7 wherein determining of the locations of the measurement points for the flat areas comprises for each flat area, establishing a start measurement point and iteratively incrementally adding the flat area sampling rate to establish the location of a next measurement point for the flat area.

10. A non-transitory computer readable storage medium having a program recorded thereon, the program being executable by a processor to track an object in a plurality of image frames, said program comprising:
code for receiving an initial contour associated with the object in a first one of the image frames, said initial contour representing an edge of the object;
code for determining a plurality of first measurement points distributed non-uniformly along the initial contour, said first measurement points being biased to relatively high information portions of the initial contour;
code for estimating a set of subsequent contours in a second one of the image frames, each of said subsequent contours being estimated from the initial contour;
code for determining an identical plurality of second measurement points along each of the set of estimated subsequent contours in the second image frame using the non-uniform distribution of the first measurement points in the first image frame; and
code for selecting at least one contour of the set of estimated subsequent contours using a confidence measure determined from the plurality of second measurement points as distributed along the selected subsequent contour, said selected subsequent contour being used to track the object in the second image frame.

11. A non-transitory computer readable storage medium according to claim 10 wherein the plurality of second measurement points for each of the estimated subsequent contours corresponds in number and distribution to the plurality of first measurement points of the initial contour.

12. A non-transitory computer readable storage medium according to claim 10, wherein the estimating of the set of subsequent contours comprises estimating splines of the subsequent contours independent of the second image frame.

13. A non-transitory computer readable storage medium according to claim 10, wherein the code for determining of the plurality of first measurement points comprises:
    code for fitting an initial spline to said initial contour;
    code for determining the first measurement points distributed non-uniformly along the initial spline; and
    code for instantiating contour particles from the initial spline.

14. A non-transitory computer readable storage medium according to claim 13, wherein the code for determining of the first measurement points comprises:
    code for detecting relatively high curvature points along the initial spline;
    code for determining high curvature areas associated with the high curvature points;
    code for determining flat areas along the spline complementing the high curvature areas; and
    code for determining locations of the first measurement points in each of the high curvature areas and the flat areas along the spline.

15. A non-transitory computer readable storage medium according to claim 14, wherein
    (a) the code for determining of the high curvature areas comprises:
        code for determining a target sample count representing the number of measurement points to be located along the spline;
        code for calculating a width of the high curvature areas representing that portion of the spline effected by high curvature points;
        code for setting a sampling ratio representing a ratio of a number of measurement points in a high curvature area compared to a number of measurement points that a uniform sampling would otherwise produce; and
        code for computing a density value representing a number of measurement points for each high curvature area of the spline, and
    (b) the code for determining the flat areas comprises:
        code for determining a number of measurement points for flat areas based upon the target sample count, the number of high curvature points and the density value;
        code for obtaining flat areas complementing the high curvature areas;
        code for computing an accumulated length of the flat areas; and
        code for computing a flat area sampling rate according to the computed accumulated length and the number of measurement points for flat areas.

16. A non-transitory computer readable storage medium according to claim 15, wherein:
    (a) the code for determining of the locations of the measurement points for the high curvature areas comprises:
        computing a sampling rate for the high curvature areas from the width and the density value; and
        for each high curvature area, establishing a start measurement point and iteratively incrementally adding the sampling rate to establish the location of a next measurement point for the high curvature area; and
    (b) the code for determining of the locations of the measurement points for the flat areas) comprises for each flat area, code for establishing a start measurement point and iteratively incrementally adding the flat area sampling rate to establish the location of a next measurement point for the flat area.

17. A camera comprising:
    an image capture arrangement for capturing a plurality of image frames of a scene; and
    a processor coupled to the image capture arrangement and a memory and operable to store the captured plurality of image frames in the memory, and
    a program recorded in the memory, the program being executable by the processor to track an object in a plurality of image frames, said program comprising:
        code for receiving an initial contour associated with the object in a first one of the image frames, said initial contour representing an edge of the object;
        code for determining a plurality of first measurement points distributed non-uniformly along the initial contour, said first measurement points being biased to relatively high information portions of the initial contour;
        code for estimating a set of subsequent contours in a second one of the image frames, each of said subsequent contours being estimated from the initial contour;
        code for determining an identical plurality of second measurement points along each of the set of estimated subsequent contours in the second image frame using the non-uniform distribution of the first measurement points in the first image frame; and
        code for selecting at least one contour of the set of estimated subsequent contours using a confidence measure determined from the plurality of second measurement points as distributed along the selected subsequent contour, said selected subsequent contour being used to track the object in the second image frame.

* * * * *